United States Patent [19]
Salazar et al.

[11] Patent Number: 5,774,841
[45] Date of Patent: Jun. 30, 1998

[54] REAL-TIME RECONFIGURABLE ADAPTIVE SPEECH RECOGNITION COMMAND AND CONTROL APPARATUS AND METHOD

[75] Inventors: George A. Salazar, Katy; Dena S. Haynes; Marc J. Sommers, both of League City, all of Tex.

[73] Assignee: The United States of America as represented by the Adminstrator of the National Aeronautics and Space Administration, Washington, D.C.

[21] Appl. No.: 536,302

[22] Filed: Sep. 20, 1995

[51] Int. Cl.[6] .................................................. G10L 5/00
[52] U.S. Cl. ..................... 704/225; 704/233; 704/239; 704/240; 704/251; 704/256
[58] Field of Search ................. 395/2.34, 2.42, 395/2.48, 2.49, 2.45, 2.53, 2.6, 2.63, 2.65

[56] References Cited

U.S. PATENT DOCUMENTS

| | | | |
|---|---|---|---|
| 4,471,683 | 9/1984 | Brown | 89/1 A |
| 4,720,802 | 1/1988 | Damoulakis et al. | 395/2.34 |
| 4,725,956 | 2/1988 | Jenkins | 364/434 |
| 4,737,976 | 4/1988 | Borth et al. | 379/58 |
| 4,747,143 | 5/1988 | Kroeger et al. | 395/2.34 |
| 4,780,906 | 10/1988 | Rajasekaran et al. | 395/2.6 |
| 4,783,803 | 11/1988 | Baker et al. | 395/2.61 |
| 4,829,576 | 5/1989 | Porter | 395/2.44 |
| 4,866,778 | 9/1989 | Baker | 395/2.63 |
| 4,912,766 | 3/1990 | Forse | 395/2.34 |
| 5,027,406 | 6/1991 | Roberts et al. | 381/43 |
| 5,036,539 | 7/1991 | Wrench, Jr. et al. | 395/2.55 |
| 5,046,099 | 9/1991 | Nishimura | 381/43 |
| 5,086,385 | 2/1992 | Launey et al. | 364/188 |
| 5,125,023 | 6/1992 | Morduch et al. | 379/88 |
| 5,161,245 | 11/1992 | Fenwick | 382/40 |
| 5,182,641 | 1/1993 | Diner et al. | 358/103 |
| 5,189,709 | 2/1993 | Wang et al. | 382/10 |
| 5,428,707 | 6/1995 | Gould et al. | 395/2.4 |
| 5,475,792 | 12/1995 | Stanford et al. | 395/2.47 |
| 5,544,654 | 8/1996 | Murphy et al. | 128/660.07 |

OTHER PUBLICATIONS

"Voice-Recognition System Records Inspection Data", NASA Tech Briefs, Jan. 1993, vol. 17, #1, p. 50.

*Primary Examiner*—David R. Hudspeth
*Assistant Examiner*—Alphonso A. Collins
*Attorney, Agent, or Firm*—James M. Cate

[57] ABSTRACT

An adaptive speech recognition and control system and method for controlling various mechanisms and systems in response to spoken instructions and in which spoken commands are effective to direct the system into appropriate memory nodes, and to respective appropriate memory templates corresponding to the voiced command. Spoken commands from any of a group of operators for which the system is trained may be identified, and voice templates are updated as required in response to changes in pronunciation and voice characteristics over time of any of the operators for which the system is trained. Provisions are made for both near-real-time retraining of the system with respect to individual terms which are determined not to be positively identified, and for an overall system training and updating process in which recognition of each command and vocabulary term is checked, and in which the memory templates are retrained if necessary for respective commands or vocabulary terms with respect to an operator currently using the system. In one embodiment, the system includes input circuitry connected to a microphone and including signal processing and control sections for sensing the level of vocabulary recognition over a given period and, if recognition performance falls below a given level, processing audio-derived signals for enhancing recognition performance of the system.

20 Claims, 13 Drawing Sheets

REAL-TIME RECONFIGURABLE ADAPTIVE SPEECH RECOGNITION COMMAND AND CONTROL APPARATUS AND METHOD

ORIGIN OF THE INVENTION

The invention described herein was made in the performance of the work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates generally to speech recognition systems and more particularly to voice activated control systems. This disclosure sets forth an adaptive speech recognition system (ASRS) which is a flexible personal computer (PC) based, adaptive speaker-independent system innovatively designed to control a variety of manufacturing, consumer oriented, medical, avionics, military and other systems by voice. By using a microphone, a user can control a designated system while perfonhing other tasks requiring full use of his or her hands and eyes. The user simply issues verbal commands and the ASRS responds by sending appropriate discrete commands to the system under control. Macro command processes incorporated into the ASRS allows recognition of one spoken word to execute a series of discrete commands. System feedback is provided to the user, visually and/or audibly, suitably by means of a visual display and audible signals suitably provided by ear phones of a headset. The system uses speaker-independent tecliology with voice adaptation caipabilities which includes querin, the user regarding questionable spoken command words. As a result of this feature, voice print template updating occurs as the user's voice changes over time. The system is also nodal in design such that it is not necessary to search the entire system vocabulary to execute commands associated with a given spoken word. Digitized raw voice data is also captured and recorded within the ASRS memory, or within external storage, for purposes of future analysis and system upgrading and expansion. Voice amplitude calibration and background noise compensation ensures optimum word recognition should microphone placement or the level of background noise change.

BACKGROUND OF THE INVETION

Prior voice recognition systems are, in general, expensive to construct and rigid in design. This is particularly true for ruggedized systems suitable for use in automobile applications, for heavy manufacturing uses such as plant floor robotics, and for military and avionics applications. Prior systems are difficult to reconfigure as well as being sensitive to vocal characteristics. An optimum set of vocabulary templates usually requires several sessions of "training" by a specific user. Rigidness of design is evident when software or voice print changes are required. In some systems, for example, software changes require the programming of a new electrically programmable read only memory (EPROM) device and the installation of the EPROM device within the system circuitry. This is a time consuming and cumbersome process which requires system shut-down. In applications involving many users and requiring large vocabularies, costs associated with vocabulary creation can be quite high and very time consuming thereby discouraging the use of the technology, even though the technology is conceptually suited for the application. Although some prior systems provide means for modifying vocabulary in real-time, these modifications are not permanently stored and are lost upon system shut-down.

Another serious problem in prior voice recognition systems is variances in microphone placement. Should microphone placement during operation vary from the placement during vocabulary training, poor word recognition results, since the amplitude parameter of the word spoken during operation differs from the amplitude parameter of the same word spoken during system training. Another limitation of prior systems is the inability to play back spoken words during the training of the vocabulary to insure that the system recognizer receives the utterance of the command word correctly. If the detection of the start and stop of a spoken word, or "frame" of the word, is improperly recorded, then misrecognition of the word will likely occur during operational task performance.

In surveying the prior art, it is clear that highly flexible systems are needed to fully exploit speech recognition technology in industrial, consumer, biomedical, military, avionics and other areas of application. This flexibility includes the ability to reconfigure the system while installed and to easily upgrade the system to new technology. Furthermore, systems which automatically compensate for variations in the user's voice, microphone placement, and background noise are also highly desirable. Manufacturing costs and operational reliability are also critical parameters in the expanded usage of speech recognition technology. The current invention meets these needs and provides other innovative features as will become apparent in the following disclosure.

SUMMARY OF KNOWN PRIOR ART

The current invention incorporates node based architecture, audio/visual feedback to the user, selective voice print template updating, confidence checks, auto gain control, microphone calibration and switchable input/output circuitry for performing various spoken commands. Each of these features will be fully defined and disclosed in the following sections. Known, pertinent prior art is reviewed in view of the afore stated features.

U.S. Pat. No. 4,471,683 to Herman E. Brown teaches a voice controlled weapon launching system. The system concerns single node systems. Feedback to the user is visual, and selective voice print updating, confidence checking, auto gain control, and microphone calibration are not taught. The output of the system is used to actuate the motors for a laser.

U.S. Pat. No. 5,027,406 to Jed Roberts et al teaches a method for creating word models for a large vocabulary, natural language dictation system. This system incorporates a node based concept, selective voice print update and a visual but not audio feedback to the user. Confidence checking, auto gain control, microphone calibration and switchable system input/output circuitry are not taught.

U.S. Pat. No. 4,737,976 to David E. Borth et al discloses an improved, hands-free user-interactive control and dialing system for use with a speech communication device. The system incorporates audio but no visual feedback to the user. Switchable input/output circuitry is taught, but limited to radio logic and control synthesizing. Node based architecture, selective voice print updating, confidence checking, auto gain control and microphonec gaibration are not taught.

U.S. Pat. No. 4,725,956 to Michael W. M. Jenkins discloses a voice command air control system for use by an operator of a remotely piloted vehicle utilizing a voice recognizer for converting spoken commands into machine compatible controls. A node based architecture is not specified. Feedback to the user is visual. Selective voice print update, confidence checking, auto gain control and microphone calibration are either not taught or not addressed. Switchable input/output circuitry uses wireless data transmission wherein the remote piloted vehicle's circuit receives the commands and acts upon them.

U.S. Pat. No. 5,086,385 to Reuel O. Launey et al discloses a system for and a method of providing an expandable home automation controller which supports numbers and different types of data communications with appliances and subsystems within the home as well as systems external to the home. Node based architecture is not specified. Audio/visual feedback is provided, as is switchable input/output to house control modules such as lighting control. Confidence checking, auto gain control, and microphone gain control are not taught.

U.S. Pat. No. 5,046,099 to Masafumi Nishimura discloses a speech recognition system wherein prior parameters of acoustic prototype vectors are adapted to a new speaker to obtain posterior parameters by having the speaker utter a set of adaptation words. A node based architecture is not specified. Visual feedback and selective voice print updating are taught. Confidence checking, auto gain control, microphone calibration and switchable input/output circuitry are not taught.

SUMMARY OF TE INVETION

This disclosure relates to a node-based speech recognition system in which "transitional" voice commands effect transitioning of a speech recognition search system into voice print template memory sections storing respective groups or subsets of words. The processor or computer component of the system does not need to search an entire data base of words each lime a word is spoken, but can limit its search to the particular subset of words within the selected node. The unit is adapted to be sufficiently versatile to respond to several speakers in a group and to be further adjusted or "trained" with respect to a particular user. The unit is applicable to consumer oriented, manufacturing, avionics, biomedical, military and other environments.

As mentioned previously, the system comprises a node-based speech recognition and command unit which can be trained and operated by voice commands. Multiple nodes, each comprising a group of words or vocabulary subsets applicable to respective subject matter, are entered in response to spoken transitional commands and exited by the use of another spoken transitional command. The spoken transitional commands serve to move or "navigate" the word search process from one node-based subset to another under the control of executive software stored in non-volatile memory. As a result of the node-based architecture, search time and therefore response time of the unit is greatly reduced in that the entire stored vocabulary is not searched for each spoken word.

Included in the speech recognition and command system is the ASRS which generates several feedback signals to notify the operator when the system has (1) recognized a voice command, (2) transitioned to a different node, or (3) failed to recognize a voice command or term, thereby requiring the operator to repeat the command or conduct further training of the system. In the preferred embodiment, several audible feedback signals are sounded, suitably by a headset worn by the operator, after each voice input. As an example, a single tone is sounded following each word spoken by the operator when the word is correctly recognized by the unit. As a further example, two tones are sounded following a spoken transitional command signifying that the unit recognizes the transitional command and that a node transition has been implemented. As a still further example, a buzzer is sounded upon questionable recognition of a spoken command as a query to ascertain the correct spoken word. Additionally, a visual display, suitably including a LCD screen or the like, provides a legible display of each command word or term upon recognition by the unit. In the case of a query, the display prompts the user for determining what questionable word or term was spokem It should be understood that whereas the foregoing are examples of feedback indicators which may be used in the preferred embodiment of the current invention, other equally suitable feedback indication means can be utilized based upon the specific application of the invention.

In the event of two rejections of a command word, the unit queries the user for updating or "retraining" the respective voice print template for the problem word. The unit interrogates the operator, by means of the visual display screen, by sequentially asking the operator if the word "X" were spoken or if the word "Y" were spoken or if the word "Z" were spoken, and so forth. The operator answers orally "yes" or "no" to each query. One advantage of this particular feature of the system and methodology is that hands-free update training of the voice print templates can be performed while the unit is in use. The use of manual input devices such as keyboards is not required. Further, all retraining is done by visual interrogation of the user by means of the visual display screen and verbal responses by the user to the interrogation. In addition, the unit is retrained on an "as needed" basis with only the problem word or phrase being addressed. Prior art systems require retraining of the entire system vocabulary if recognition failures occur. This requirement is very time consuming and operationally detrimental.

In addition to the provision for near-real-time retraining with respect to problem words, the speech detection system permits voice command confidence checks of all of the templates for each node. If placed in the voice print acquisition mode, the ASRS sequentially displays the words and transitional terms, visually asking the user to read the words into the microphone as they are displayed. This operation provides a check of the vocabulary immediately prior to switching the system to the real-time acquisition or "applications" mode. If a word is not clearly identified, the system asks for a second reading, and retrains itself with respect to that word only, in correspondence with the current voice characteristics of the user. Confidence checking with respect to a single word or term is a novel feature of the present invention.

In one embodiment, a headset microphone cooperates with the speech recogtion &ement of the ASRS by means of an input/output (I/O) board, which will be discussed in detail in a subsequent section. The input from the microphone is applied to an automatic gain control (AGC) circuit as well as to an analog switch. The switch, which is under control of executive software, is switched such that the speech recognition element of the ASRS either receives raw input obtained from the microphone or gain adjusted input which has been routed through the AGC circuit. Microphone calibration may be performed before each use of the ASRS, if needed, or may be performed automatically under software control while the ASRS is operating in the real-time data acquisition mode. The microphone calibration operation tailors the response of the system to the speech of an individual user during a particular time span, including speech characteristics relating to the user's placement of the microphone. The user identifies himself, and the system begins with a predetermined set of gain ranges which were previously found suitable for that particular user, starting in the middle of the range and calibrating upward or downward. In addition, a programmable gain amplifier is employed which includes an operational amplifier (Op-amp) circuit with a feedback resistance. The feedback resistance comprises, in the illustrated embodiment, an EEPROM resistor connected between the analog voice input and the voice recognition element. Under the control of executive software, the level of gain is adjusted as required during the microphone calibration. This adjustment is based upon the status messages and/or recognition scores determined from the speech recognition element, both of which are transferred to the ASRS computer element for software controlled analysis during the microphone calibration process.

A digital I/O circuit is provided between the speech recognition element of the ASRS and discrete input devices such as an actuating motor, or switches for turning on indicator lights and the like, and provides digital data outputs on multiple lines. Details of this circuit will be discussed subsequently. Briefly, the circuit is used optionally to switch to a different software control routine through the use of manual switches, or to put the entire system in an inactive or standby mode wherein the ASRS does not respond or "listen" to the input from the microphone.

Attention is now directed to a brief description of the major components of the Adaptive Speech Recognition Unit (ASRU). The ASRU is a highly flexible, PC based, adaptive and speaker independent unit which is imbedded in the ASRS and which comprises both custom designed and commercially available circuit sections. The use of commercially available circuit boards, where possible, reduces the manufacturing cost of the unit and can reduce maintenance costs in some applications. The ASRU comprises six major circuit boards which are plugged into a passive backplane. A commercial PC-AT processor board controls the overall operation of the unit. A commercial, speaker-independent speech recognizer board is used to determine which word is spoken. A custom made applications interface board is used to send digital signals to external devices to perform the desired tasks spoken by the user. This interface circuit is under the control of the PC-AT processor board, which is also referred to hereafter as the "computer". An analog circuit board is used to interface the user headset to the PC-AT processor board through the headset interface unit. A solid-state disk and associated control circuitry is interfaced with the previously described analog circuit board and is used to record raw voice samples from the headset microphone and to run the voice print collection software, as will be outlined below. Finally, a power supply circuit is used to convert available voltages to voltages required to operate the PC-AT circuit and other circuits within the ASRU, and also, supplemental ASRU equipment such as cooling fan motors.

The various modes of operation of the ASRS according to one preferred embodiment will now be briefly summarized. A more detailed description of these operational modes will be presented in subsequent discussions.

In the voice print acquisition mode, a video graphics adapter is installed into the ASRU PC-AT bus to allow the operator to view, on a monitor, the collection and review of the voice prints of the command word vocabulary. The headset, which is also used in the actual operational mode, is attached to the ASRU as well as an audio speaker to listen to the voice prints collected. Playback of the collected voice prints checks for proper word framing of the voice print collection. After the collection session, the voice prints are used to create the speaker-independent vocabulary. The PC-AT processor board interfaces with an external hard disk to run e voice print collection software as well as to store the raw voice print data.

In the real-time acquisition mode, the system, upon power up, permits the user to enter the setup node by saying "setup". Microphone calibration and confidence check occurs in this node. The system first calibrates the microphone input level by asking the user to repeat soft spoken words, by prompts shown on the visual display. The signal is amplified or attenuated until acceptable recognition scores are obtained. Further conditioning of the audio signal occurs by enabling the automatic gain feature previously described. Next, the system queries the user to see if a confidence check of the vocabulary is desired. Upon completion of the confidence check, the unit transitions to a standby mode until the user enables the unit by saying, in the preferred embodiment, "voice command" and then, within two seconds, "activate". This prevents inadvertent activation of the unit into the operations mode.

Once in the operations mode, transition commands direct the system to the desired node. Subsequently, specific commands are spoken to implement the desired activities associated with the specific ASRS application.

In the software downloading/uploading mode, the software resident in the ASRU allows data files to be loaded into the solid-state memory of the PC-AT processor board through an external computer source. This allows updating of the ASRU software without installing a new EPROM. Similarly, data files such as raw voice samples captured while performing actual operational tasks can be uploaded into another computer for analysis without interrupting operation of the ASRS.

For the audio message mode, the ASRS allows total system message recording for a predetermined length of time. These messages are used for audio feedback to the user such as prompts for other operations that may be simultaneously pursued. Again, no nonvolatile memory device or the like is required in that the function is performed with the software and the headset of the ASRS.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate typical embodiments of this invention only and are therefore not to be considered limiting of its scope, for the invention may admit to other equally effective embodiments.

DETAILED DESCRIPTION OF THE PREFERRED EMBODIMENT

Figure 1:
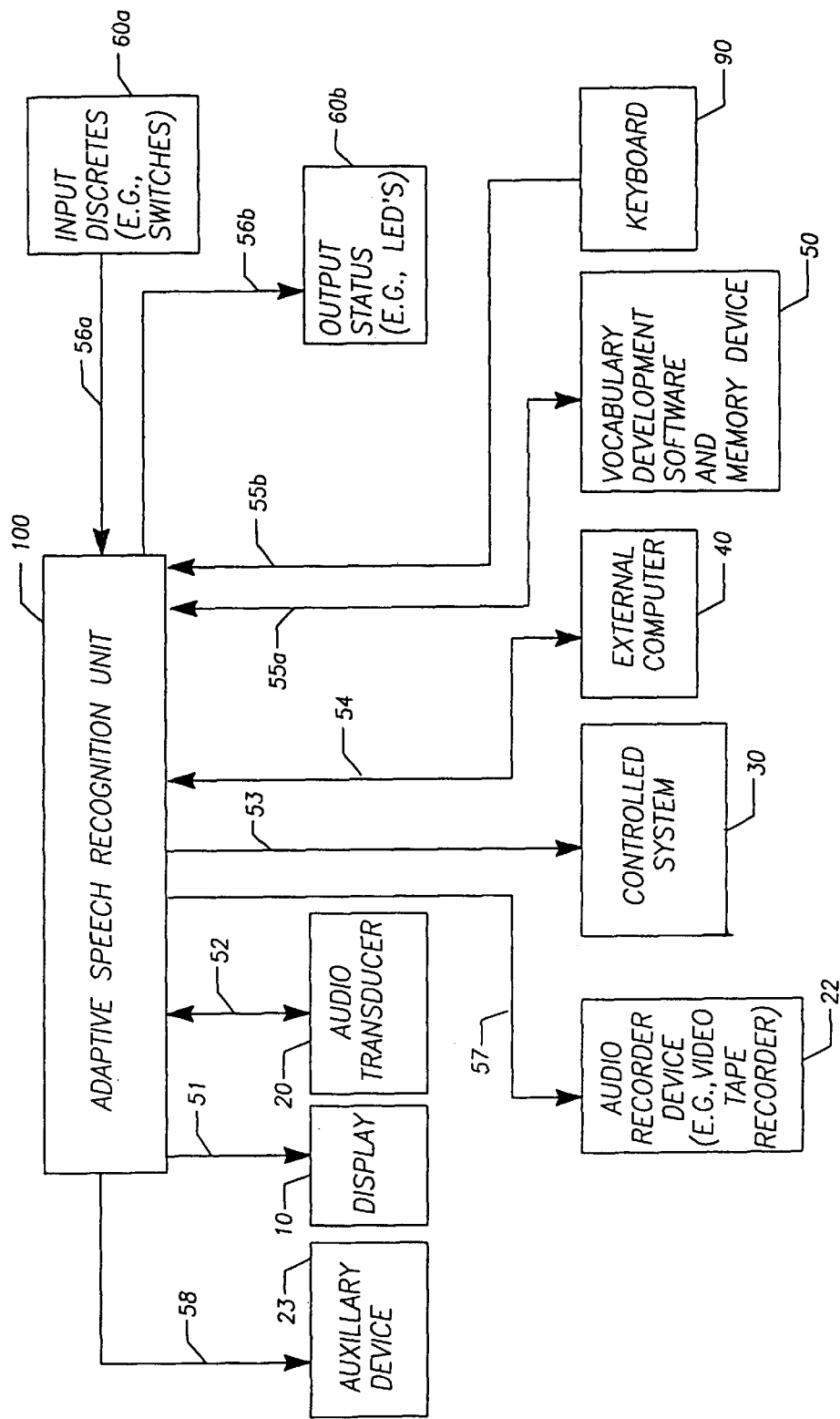
FIG. 1 depicts in general the embodiment of the invention showing the major elements of the apparatus and the paths of cooperation for these major elements.

The invention is embodied as depicted generally in FIG. 1 which is a functional block diagram of an embodiment of the embedded speech recognition unit and control system. Spoken commands from an audio transducer such as a headset 20 are sent over communication path 52 for recognition by the adaptive speech recognition unit (ASRU) 100. Based upon the command word spoken and recognized, the ASRU sends the appropriate response commands over communication path 53 as discrete outputs to a controlled system such as a device 30 that is to be manipulated by voice commands. The device 30 accepts discrete commands and responds accordingly. The device 30 may be a video camera, or an ultrasound transducer or a manufacturing robot, or a control system for an automobile stereo or heating/air conditioning unit, or the like. Alternately, the spoken word generated output of the ASRU is transmitted as computer data over communication path 54 to a device such as an external computer 40. Feedback to the user is provided via communication path 52 to the audio transducer 20 such as headset earphones and reproduced thereby in the form of audio tones or messages. In addition, visual feedback is provided to the user by means of the display 10. Data from the ASRS sent through communication path 51 to display 10 informs the user as to what word has been recognized by the ASRU, what mode the headset is in ("hot mike" or push-to-talk) and in which vocabulary node the recognized word resides. In addition, the display 10 provides a means for presenting query messages to the user for adapting problem words during real-time recognition. Audio data such as spoken commands and audio tones and messages are sent out over communication path 57 to an audio tape recorder 22 which in one embodiment is actually a video tape recorder used for audio recordal. The ASRU has an internal power supply (not shown in FIG. 1) for providing power to its internal devices and boards. The power supply also provides output power by means of power signal path 58 to an auxiliary device 23 such as a direct current (DC) driven fan for cooling the electronic components.

The ASRU provides a means for interfacing inputs from discrete input devices 60a, such as switches, via communication path 56a for events such as manually placing the ASRU in either the active mode for listening, or the standby mode, in which voice commands are not accepted. Alternately, the discrete input device 60a can be used for resetting the ASRU in the event of a fault. Additionally, output status signals are sent through communication path 56b to activate output status elements such as visual display indicators 60b to visually indicate to the user whether the ASRU is in the active or standby mode, or that a fault has occurred, or that power has been applied to the ASRU. It should be noted that the ASRU can be placed in active or standby either manually, by means of a switch closure, or by spoken commands as previously noted.

Referring again to external computer 40, communication path 54 also allows for downloading as well as uploading programs and files into the ASRU's reconfigurable non-volatile memory. Communication path 54 therefore provides the flexibility for either control of a speech recognition computer application or reconfiguring the ASRU software and files. It should be pointed out that the ASRU can control simultaneously a device 30 requiring discrete commands as well as a speech recognition computer application. This is an advantageous feature when an application requires both functions.

A data storage device such as a hard disk, shown in FIG. 1 as a vocabulary development software and memory device 50, and a keyboard 90, are interfaced to the ASRU 100 through communication path 55a and 55b, respectively. Communication with the hard disk and inputing keyboard commands, to run the software from the hard disk, occurs through this interface. This interface and capability is used for development purposes on the ASRS, where such development may include increasing stored vocabulary, modifying stored vocabulary, varying output command signals and the like. This feature is advantageous in that large development software programs may be required, and such software may exceed the vocabulary and command data storage memory required by the ASRU when operating in the operational mode. One development software program in particular is the vocabulary development program for capturing raw voice prints to create a system vocabulary. By attaching a video graphics card to the ASRU computer bus and interfacing the ASRU processor to the hard disk drive and keyboard, the ASRU processor can run the program that captures, plays out, and stores voice prints for vocabulary development. After a set of voice prints has been collected, the developer can review the voice prints captured to ensure that the words are properly framed and captured, that questionable words have be repeated and stored to ensure the vocabulary is properly defined, and that the vocabulary is properly subdivided within the proper nodes.

The ASRS adjusts the amplitude and suppresses noise in the input audio signal from the headset unit 20 which is interfaced to the ASRU 100 by means of communication path 52. Through microphone calibration, the ASRS ensures that maximum signal strength occurs in the presence of microphone placement variances. Furthermore, confidence checking and query of the user with respect to problem words ensures that the system gets better in recognizing the user the more he/she uses the ASRS.

VIDEO CAMERA CONTROL EMBODIMNT OF THE INVENTION

Figure 2:
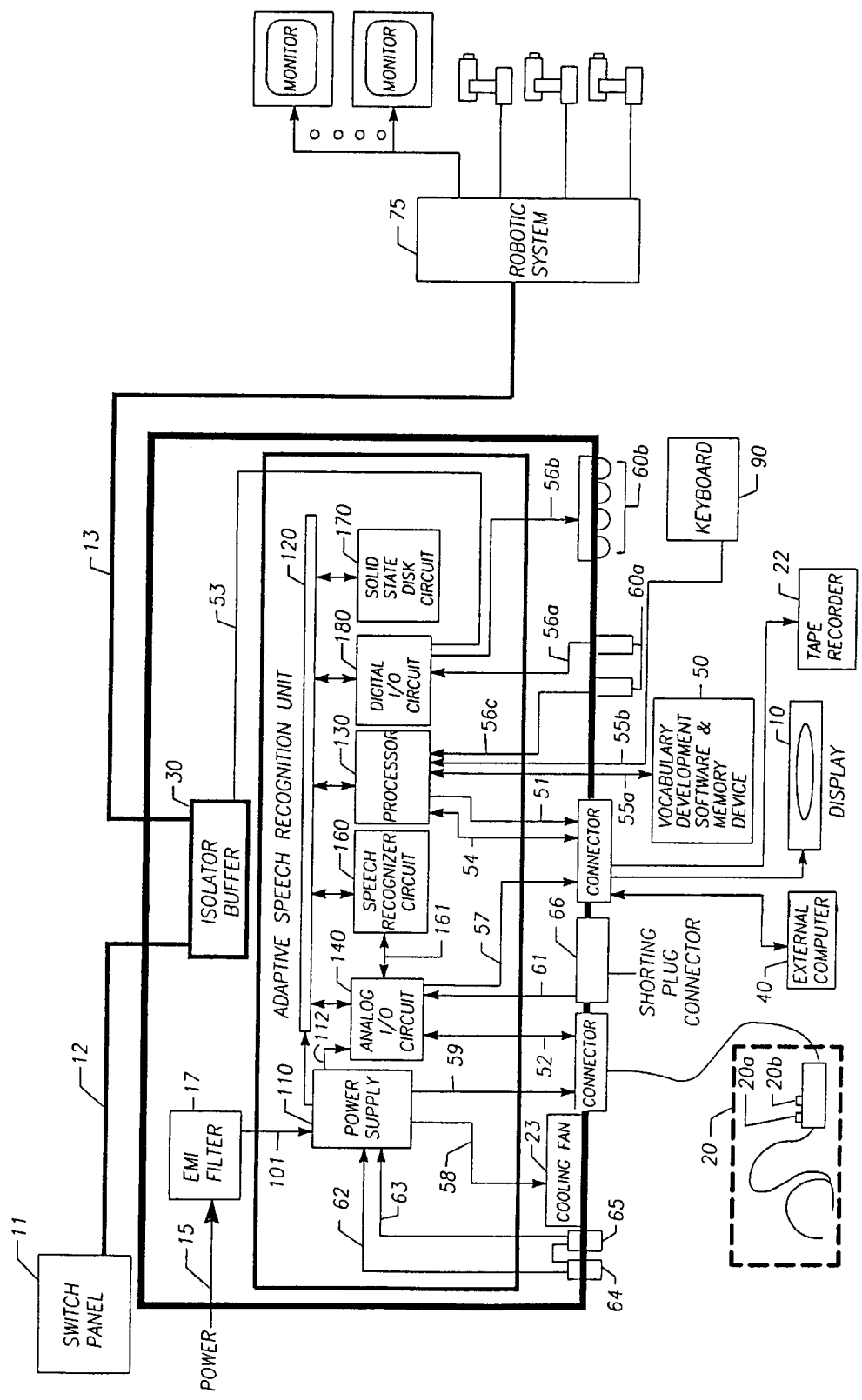
FIG. 2 is a more detailed functional block diagram of the adaptive speech recognition system adapted for use as a robot voice command system.

Attention is now directed to FIG. 2 which depicts the first of two exemplary application embodiments of the invention. In this embodiment, the invention is adapted for use in the control of a remote system such as a servo positional video camera and more particularly to the Voice Command System (VCS) for controlling a remote system for directioning such a camera. Such a system may be used in security surveillance, vehicular traffic surveillance, and the like. The adaptation is presented for purposes of illustration and should not be considered as limiting the scope of the invention. In this embodiment, the VCS controls a Closed Circuit Television (CCTV) system.

The ASRU 100 comprises six major circuits which are the power supply circuit 110, the analog input/output (I/O)

circuit 140, the speech recognition circuit 160, the PC-AT computer or processor circuit 130, the digital I/O circuit 180 and the solid-state disk circuit 170. These circuits, in the form of circuit boards, are plugged into a passive backplane and cooperate via a bus 120. Power to the ASRU 100 is supplied from the system's 28 volt direct current (VDC) power supply system. The 28 VDC is supplied to the power supply module 110 from the VCS EMI Filter 17 which filters the system power coming in on the power signal path 15. The ASRS power supply module 110, in turn, coverts the 28 VDC received through path 101 into the proper voltages required by the ASRS electronics. Power is supplied to the bus 120 for distribution to the boards attached to the bus, to the VCS fan 23 (which forced air cools the electronics), through power signal path 58, and to the analog I/O board 140 analog section through power supply signal path 112. Other power sources such as alternating current (AC) or batteries can be used as well. The power switch 64 routes the 28 VDC comning from signal path 101 through path 62, through the switch 64, through the circuit breaker 65, and back out through power signal path 63 into the power supply module 110, where it is converted into the ASRS operating voltages. Power is also supplied by means of power signal path 59 to the headset unit 20 for powering the headset circuitry.

The ASRU computer 130 orchestrates the operation of the ASRS. The executive software that controls the ASRU preferably resides in re-programmable, non-volatile Flash Electrically Programmable Read Only Memory (EPROM) located on the computer 130. Commands are sent to the appropriate board through the computer bus 120. The computer 130 interfaces with an external hard disk drive 50 through communication path 55a, to an external computer 40 through communication path 54, and to the VCS display 10 through communication path 51. The function relationship between these elements have been discussed briefly and will be discussed subsequently in more detail. A reset signal to the computer in the event of a fault can be received through communication path 56c by means of the front panel reset switch 60a. The VCS display 10 provides for a thirty two character, one-line visual display of the recognition status of a spoken command specifying if the command has been recognized or if the command has not been recognized. The display also prompts the user concerning steps in the proper adaptation of problem commands or words. Finally, the display is used to visually convey system error messages.

Still referring to the FIG. 2 with respect to the computer 130, the communication path 55 allows the ASRU 100 to run software from an external hard disk drive and keyboard 50 in which additional memory is available for utilizing system development software in addition to the memory contained within the computer 130. This enables the system to execute large software programs such as the recognition software for capturing voice prints from multiple users in order to create a stored vocabulary that can be matched with the voices of multiple users. During voice print capture, the software allows for proper framing of captured voice prints to ensure that the speech recognition circuit 160 shown in FIG. 2 "heard" and properly processed the correct word. This function is performed by playing back the captured spoken commands during the voice print capture session as described earlier. Words not correctly captured may be observed by the user, and are then repeated by the user for correcting the voice print. This is beneficial when, during the training of the vocabulary, the user speaks the word prompted by the system incorrectly. Words spoken incorrectly and not detected during voice print acquisition can, of course, produce poor recognition performance. Furthermore, this checking of vocabulary allows the capturing of the actual voice from the headset and any system noise associated with the audio in the embedded application. This creates vocabularies which include any system or external background noise which, in turn, produces better recognition accuracy. In the operational mode of the ASRS, the hard disk is not attached.

Still referring to the computer 130, communication software resident within 130 allows for communications with an external computer 40 by means of the communication path 54. This feature allows for reconfiguring the executive software or files while the ASRU remains in-situ and on-line. This also eliminates the burden of having to remove and replace memory devices within the embedded ASRU of the ASRS which can impact delivery schedule and system update costs should software changes be required. Communication path 51 conducts computer data, such as that required for the VCS Display 10, one-way. A more detailed description of each of the printed circuit (PC) circuitry under the control of the processor or computer 130 follows.

The analog I/O Board 140 interfaces the headset unit 20 into the ASRU 100. Both microphone and earphone signals as well as headset mode change control signals, such as the push-to-talk (PTT) signal, are transmitted on communication path 52. The PTT control signal causes gating of the audio into the speech recognizer 160 only when the PTT switch on the headset interface unit is depressed. This ensures that audio is recognized only when the user is speaking into the microphone to the ASRU, thereby minimizing misrecognitions. An additional headset mode change is provided by a second push button on the headset interface unit called ICOM (Inter Communications) which is suitably used for inter communications in the present embodiment. The user simply pushes the button 20a to toggle from the PTT to push-to-disable (or hot mike) or visa versa. In the push-to-disable mode, the PTT switch, when depressed, inhibits voice signals getting into the speech recognizer 160. Other headsets and interface units can also be accommodated as well. The board 140 contains audio message chips for creating and sending out audio messages to the user by means of the headset earphones over line 52. Audio signals such as command words conducted over communication path 52 are received, impedance matched, signal conditioned, and sent to the speech recognizer board 160 via the communication path 161. Similarly, feedback tones from the speech recognizer board 160 are sent back on communication path 161 to the analog I/O board 140, and subsequently to the headset 20. All audio coming into or out of the analog I/O board 140 by means of communication paths 52 or 161 is sent on the communication path 57 to a recording device, such as the tape recorder 22. This recorded audio is used to correlate spoken commands with the recognition scores as well as to record comments from the user. The analog L/O board 140 digitally scales the amplitude of the audio signal coming from the headset as well as configuring the headset for either the PTT mode, the Push-to-disable (PTD) mode, or the enabled microphone or "hot-mike" mode. Commands are sent from the computer board 130 to the analog I/O board 140 via the ASR bus 120, as will be detailed in a subsequent section. These commands can be: (1) to record audio message, (2) to increase/decrease the audio gain, (3) to configure for PTT, PTD, or hot-mike, (4) to play-out audio message, or (5) to enable the automatic gain control (AGC) circuit. The scaling of the audio signai through software/hardware either digitally increasing or decreasing the gain as well as enabling the AGC allows for optimizing the signal from the headset should microphone placement vary or the speaker's voice amplitude change.

The speech recognizer board 160 is controlled by the computer 130. The computer executive software configures the speech recognition board 160 before going into the recognition mode. The configuration includes enabling the computer 130 such that vocabulary from external, non-volatile memory preferably in external computer 40 is transferred into the memory (not shown) of the speech recognition board 160. In recognition mode, the speech recognition board 160 accepts spoken command words coming over communication path 161 and compares the spoken commands with the vocabulary stored within the memory of the board 160. Results of the recognition are sent to the computer 130 over the computer bus 120. Based upon the recognition results, the computer 130 executive software determines if adaptation of the spoken command word is required or sends the command, either on communication path 53, to a discrete input device 30 (in this embodiment, the VCS CCTV interface or isolator buffer 30), or on communication path 54 to the external computer 40, or to both. In addition, the computer board 130 can record the raw spoken commands into the solid state disk board 170 by retrieving the raw digital voice data from the speech recognizer board 160. Should the data from the board 160 indicate that the word is not recognized, the computer 130 sends the appropriate display messages to the VCS display 10 for ascertaining what word the user spoke and sends a command via the computer bus 120 to the speech recognizer board 160 for the appropriate tone to play-out to the user headset 20, by means of the analog I/O board 140. The speech recognizer board plays out three tones. A single tone indicates good recognition. A double tone indicates vocabulary node transition. A buzzer indicates a questionable recognition. The computer 130 also sends a background check command to the recognizer board 160 which listens for background noise and sets the amplitude level of the background noise as the threshold for recognition. This helps in compensating for noisy operational environments.

The solid-state disk board 170 stores raw data such as raw digital voice from spoken commands. In addition, command files, back up voice vocabularies and/or programs can also be stored within the solid state disk board. Data storage and retrieval from the board 170 is under control of the computer 130. The external computer 40 can access this information by means of the communication path 54.

The digital I/O board 180 provides an interface between the VCS front panel switches 60*a* and light emitting diodes (LED) 60*b* and the ASRU. When depressed by the user, the reset switch, which comprises one of the panel switches 60*a*, conducts a reset signal to the computer 130 via communication path 56*c*. This event occurs when the watchdog timer in the digital I/O board 180 is no longer pulsed by the computer 130, which keeps the reset LED 60*b* off. The lighting of the reset LED indicates that a system fault has occurred. The active/standby switch, which comprises one of the panel switches 60a, when closed sends an interrupt to the computer 130 to place the ASRU in either the active or the standby mode (i.e. "listening" or "non-listening" mode) depending on the previous mode of the ASRU. The ASRU can be placed into action or standby mode either manually by means of a switch, or by voice. The computer 130 responds by putting the system in its appropriate mode and then by toggling the active/standby LED's 60*b* to their appropriate state. The ASRU can also be placed in adjust mode wherein the vocabulary is interactively modified.

Finally, the ASRU can be placed in the macro mode in which transitional commands can interactively be modified. All of the transitional commands can be implemented either by voice command or by switch.

Discrete commands sent from the computer 130 over the bus 120 are sent to the VCS CCTV isolated buffer board 30 from digital I/O interface board 180 over the communication path 53. The commands in turn are sent to the system robotic system 75, in the embodiment of FIG. 2 a CCTV system The commands are for activating TV monitors 76*a* or 76*b*, for activating any of the system TV cameras, identified by the numerals 77*a* through 77*c*, or for commanding the pan/tilts units or camera functions such as "pan left", "tilt-up"; or "zoom out". In the adjust node, computer 130 can 5 send adjust or fine-tune commands to the CCTV system via the digital I/O board 180. By first specifying the number of degrees of pan or upward or downward tilt required, through voice commands, the user can pan or tilt a camera the number of degrees specified. It should be pointed out that commands can also be sent by the CCTV system switch panel signals 11 via the communication path 12 to the VCS CCTV I/F board 30 and subsequently to the robotic system 75, in the embodiment of FIG. 2 a CCTV system via communication path 13. Signals from either switch panel 11 or voice generated signals from the digital interface board 180 can command the robotic system 75, in the embodiment of FIG. 2 a CCTV system.

Figure 3A:
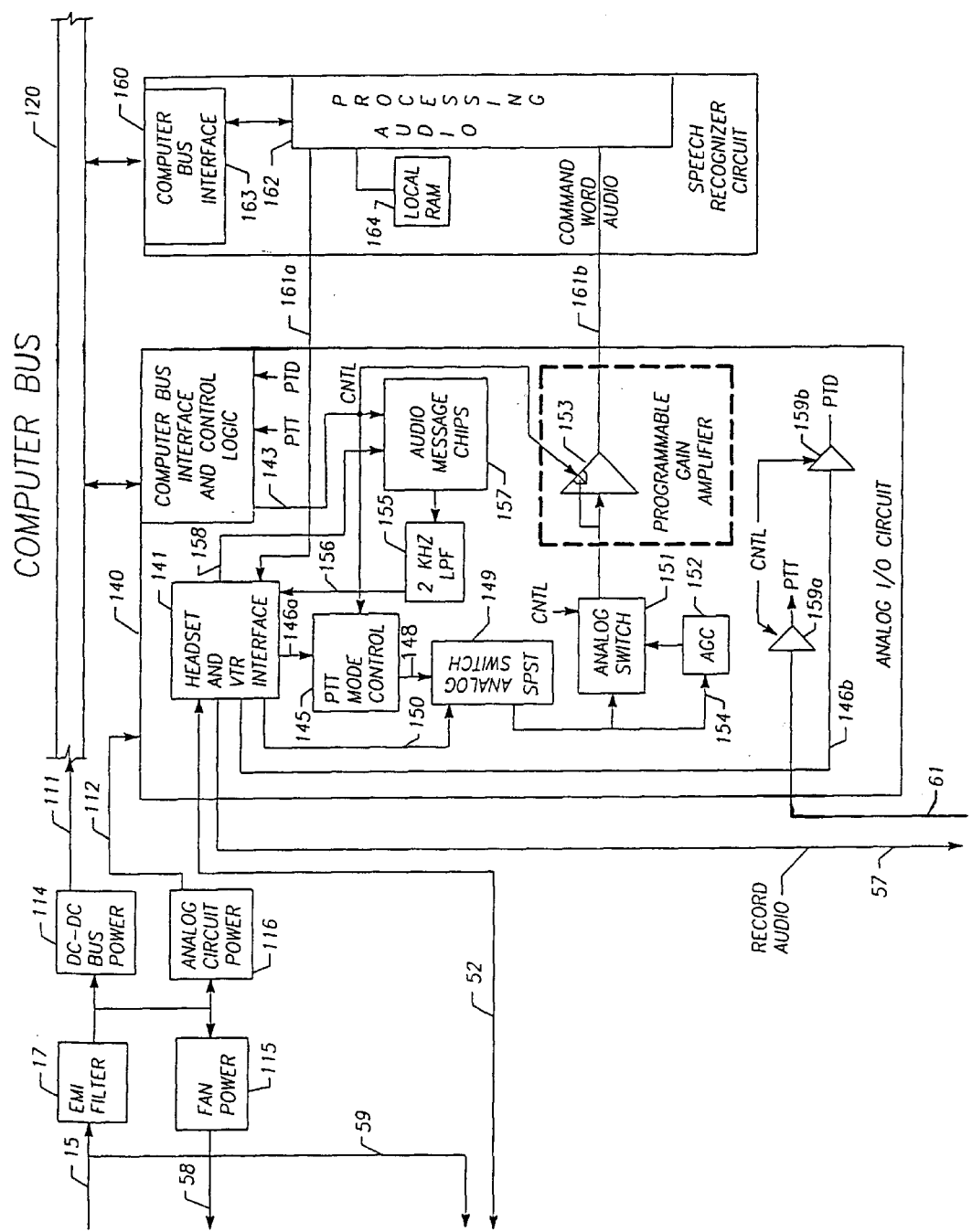
FIGS. 3A and 3B presents an even more detailed functional block diagram of the adaptive speech recognition system adapted for the control of the closed circuit television system of a robot system.
Figure 3B:
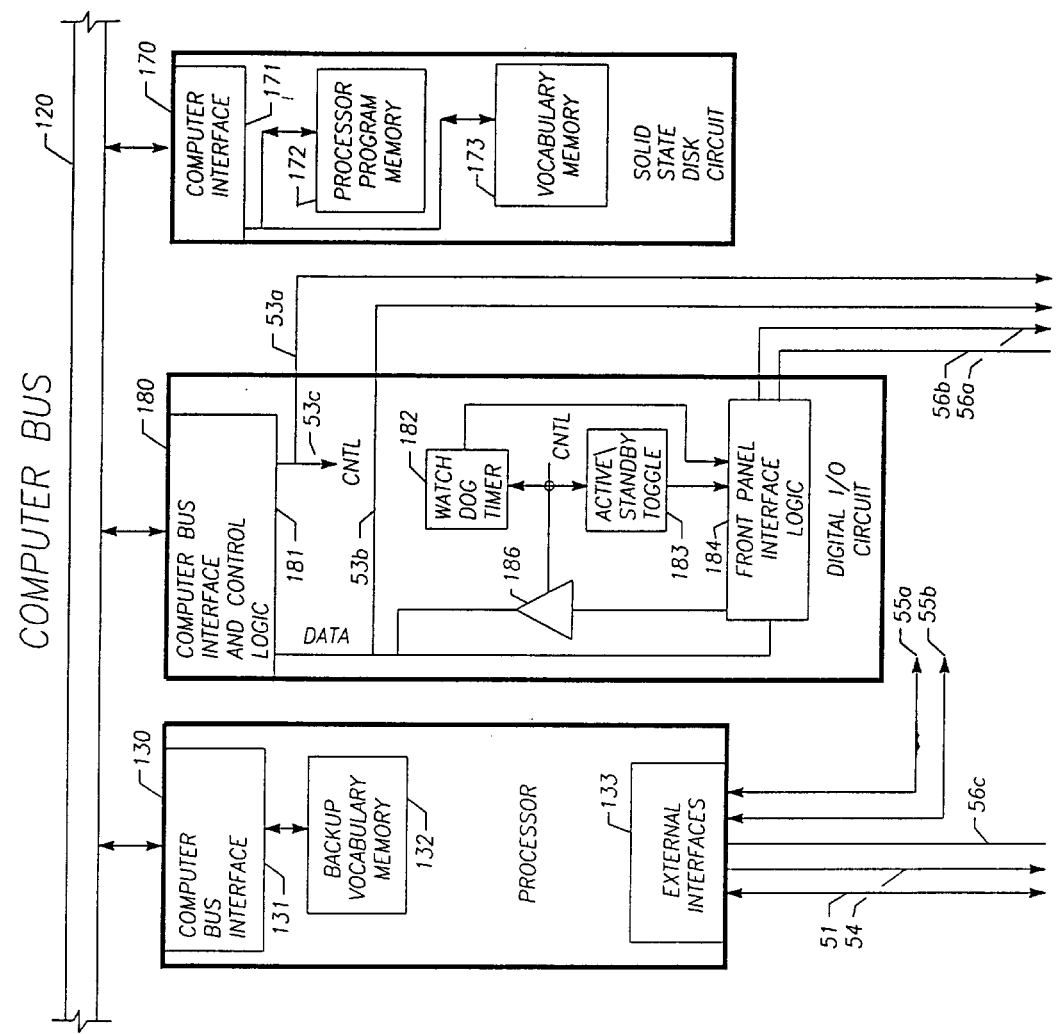

FIGS. 3A and 3B together are more detailed functional block diagram of the ASRU and control system depicted in FIG. 2. External 28 VDC power is supplied via the power signal path 15. The power is first filtered by the EMI filter 17 to meet the military standard 461A for Conducted Emissions (CE-03). Referring again to FIG. 2, power is also sent from the EMI filter 17 to the power supply 110 via path 101, and from the power supply 110 to the headset 20 via path 59. The output DC power from the filter 17 is sent to the PC-AT DC-DC bus power board 114, to the analog power board 116, and to the VCS fan power board 115 where the 28 VDC is converted to voltages for the computer bus, the analog section of analog I/O board 140, and the VCS fan (not shown), respectively.

Referring to the analog I/O board 140, microphone audio signals which consists of spoken command words from headset 20 enter the ASRU 100 by means of communication path 52 into the analog I/O board through the headset and video tape recorder (VTR) interface circuitry 141 (see FIG. 2). The electronics in 141 provide impedance matching of the headset unit 20 and provide an output audio signal to a recording device over communication path 57 such as the Shuttle VTR. Two control signals from the headset 20 for PTT or PTD operations of the headset audio is sent via communication path 52 and received by the VTR circuitry 141 as well. The PTD signal on communication path 52 comes from the headset 20. This signal determines the headset mode of operation. By simply depressing the ICOM button on the headset 20, the user can toggle from PTT to PTD or visa versa by depressing the ICOM button again. The PTD signal received by the headset and VTR interface 141 is sent to 159*a* via the communication path 146*b*. Depressing of the ICOM button on the headset 20 results in a bit "0" on 146*b*. A control signal from the computer interface and control logic 142 transmitted over communication path 143 determines whether to route the signal from communication path 146*b* to the computer interface and control logic circuit 142 by enabling the buffer 159*b*. The computer 160 in turn reads the bit to determine headset mode. Similarly, the PTT signal is sent to the PTT mode control logic 145 by means of communication path 146a. The control signal is "x-ored" with the PTT enable control signal (CNTL) 143 from the computer interface and control logic 142. An alternate means of PTT operation occurs when a shorting plug 66 shown in FIG. 2 is present. If the shorting plug 66 is present, an "0" bit will result on communication path 61, thereby indicating PTT operations. A control signal 143, FIG. 3A, generated by the computer 130 via the computer interface and control logic circuit 142 determines whether to route the bit from communication path 61 to the circuit 142 by enabling buffer 159a for the computer to read. This alternate means of PTT operations is provided should the user choose not to use the ICOM feature and remain in PTT mode throughout the task. In the PTD mode, the PTT signal coming from 20 along with control signal 143 into the PTT mode control 145 inhibits audio from getting into the recognizer 160 when the PTT button is depressed. The only other time the ASRS defaults to the PTT mode automatically is when a macro command is being executed to prevent inadvertent stoppage of the macro command due to conversations or high background noise being misrecognized as a "stop" command. Control signal "CNTL" is local and contains a plurality of control signals for controlling the hardware on the board 140.

In PTT mode, the appropriate signals enabled at PTT mode control element 145 result in PTT headset operation. This requires the user to depress the headset interface unit PTT button on the headset 20. Afterward, control signal on communication path 148 activates the switch 149 to gate the analog signal from headset audio on communication path 150 coming from the headset by means of communication path 52 out of the switch on path 154. This path goes to both the second analog switch 149 (a single-pole double-throw type) and to the AGC input denoted by the numeral 152. A control signal at 143 output by the computer interface and logic circuit 142 determines whether to route the audio from point 150 or the AGC adjusted signal from the point 152 to the programmable gain amplifier 153. Under software control from 130, the programmable gain amplifier 153 is adjusted, using a control signal 143 fom the output of the computer interface and logic circuit 142, until recognition results from the speech recognizer board 160 indicate to the computer 130 that the headset signal amplitude is sufficient. The electronic programmable gain amplifier 153 can be adjusted quickly and automatically based upon the effectiveness of the system in recognizing words spoken by the user. This is advantageous for microphone calibration and provides an important advantage over prior art systems in which repetition or subjective methods were required. During microphone calibration, the gain is adjusted upward or downward electronically until recognition scores improve or, in the case of the microphone being too far away from the user, until "spoke too low" messages are generated. The computer 130 monitors the progress while orchestrating the microphone calibration. This monitoring and orchestration consists of the computer prompting the user to say predefined words and evaluating the recognition scores. Depending on the scores, the computer 130 issues the gain adjust command via the computer bus 120 to the computer interface and control circuit 142, where it is decoded and sent to the programmable gain amplifier 153. The signal conditioned audio signal is routed over communication path 161b and received by the audio processing section 162 of the speech recognizer board 160, where it is digitized and compared to the vocabulary presently active. The microphone calibration processing can remain on while in the recognition mode, constantly updating the gain based on recognition response in real-time, without prompting the user to say predefined words. This occurs by reading the microphone calibration enabling flag in the configuration file which is set based upon the particular speech characteristics of the user.

Again referring to the analog I/O board 140, message chips 157 contain previously stored user audio messages for prompting during recognition mode. Messages are related to prompting the user to select cameras or monitors as well as macro commanding-specific messages. Control signals output at 143 associated with accessing the message chips are generated from the computer interface and control logic 142 as will be more specifically described hereinbelow. These signals are applied to the appropriate chip for playing select messages. The message audio output of the audio message chip 157 is first routed through a 2-KHz low pass filter (LPF) 155 for band-limiting, to minimize playout noise. The band-limited signal on communication path 156 is sent to the headset and VTR interface circuit 141 where it is distributed back to both the headset earphone (not shown in FIG. 3 but shown in FIG. 2) via the path 52, and to the recorder 22 shown in FIG. 2 via communication path 57. Also, control signals output at point 143 enable audio message chip 157 to allow for recording new audio messages sent over communication path 158 from communication path 52 into the audio message chips 157. This can be done in-situ without having to take the ASRS system out of operation.

With continued primary reference to FIG. 3, with respect to the analog I/O board 140 once again, the amplifier output at 153 is sent over the communication path 161b to audio processing element 162 of the speech recognizer board 160. The audio processing element 162 converts the analog audio into digital form and processes for recognition. Upon determining what word is recognized by means of inherent and known fuinctions, the speech recognizer board 160 returns the results of the recognition to the computer 130 via the computer interface 163 on the bus path 120. The information returned consists of the most likely spoken command words, e.g. the four most likely candidates, and their recognition scores, as well as an indication of deviation or the "delta" score between the first and second choice word. The scores are categorized from the lowest to the highest, with the lower score indicating a best match. If the recognition score is low and is less than the recognition acceptance threshold set in the software and the delta score between the first choice and the second choice is larger than the preset value also set in the software, the word spoken has a high degree of confidence. If, however, either of the two above criteria are not met, the word spoken has a low degree of confidence. In that case, the processor 130 first instructs the speech recognizer board 160, by means of instructions sent over the bus 120 into the interface 163, to send the query buzzer tone back to the user by means of the communication path 161b, through headset and VTR interface 141, and subsequently out on the communication path 52 to the headset 20, and simultaneously out communication path 57 to a VTR It should be pointed out that under software control, the processor can change the recognition acceptanc and delta threshold parameters dynamically. This is advantageous when poor recognition performance is occurring even when microphone calibration and confidence check has been done. By relaxing these parameters, some better recognition performance can be obtained. Next, the computer 130 uses only the first two words returned from the speech recognizer board 160 for the query. The processor 162 then sends one word at a time to the display 10 along with a "yes/no" verbal response. If a "yes" is recognized for the word on the display, the processor instructs the speech recognizer to adapt the word. At that point, the word adaptation update is placed in random access memory (RAM) of the speech recognizer circuit 160. It is not until the ASRU is placed in standby, either by voice command or manually by switch, that the updated vocabulary is stored in flash EPROM in the computer 130 to ensure the updated vocabulary is permanently stored. Query occurs during the actual operation of the ASRS when two questionable recognitions occur consecutively. That is, the ASRU can query the user at any time the ASRS is in the operation mode. Query allows capturing the actual annunciation of the spoken commands during the use of the ASRS in the actual application and at a given time of day. The user's annunciation of words over different periods of time is captured, which may therefore include annunciation when the user is fatigued or sick.

The above explanation of the query process is similar to the process for confidence checking. The computer 130 prompts the user, by means of the display 20, to say a command word from a predetermined, stored list of commands. The recognition results are sent to the computer 130. If the first spoken word is in fact the word prompted by the display 20, the computer 130 prompts the user to say the next word. If, however, the displayed word (prompted to say) is not the first choice spoken word, the computer 130 searches the remaining three of the top four choice words returned from the speech recognizer 160. If the word prompted to say is one of the remaining three, a match between the spoken and stored prompt word is found and the computer instructs the speech recognizer to adapt the word thereby updating the vocabulary. If the word is not one of the four returned words, the computer issues a "send buzzer" command to the speech recognizer and a display message to 20 for notifying the user say the word again. Not until one of the four words is the actual visually displayed word (prompted to say) will the routine go to the next word in the vocabulary. The confidence check ensures that all words are tuned before going into the application mode of the ASRS.

With continued reference to FIG. 3B, attention is now directed to the digital I/O board 180. Based upon which word is recognized, the computer 130 sends both the address and the data over the bus 120 to the digital I/O circuit 180. The digital I/O board has the capability to send 8-bit data to several address locations of elements to be controlled via communication path 53a. More locations can be added if required to operate additional elements or perform different functions. The present system provides control of a remote CCTV system using the VCS, and data and chip selections are sent to five different latches for routing on the communication path 13 to the robotic system 75. A list of commands associated with each macro command word resides in the memory of the computer 130. When the user places the ASRS in the macro node and a macro command is spoken, the computer 130 sends a plurality of signals over the bus 120 to the digital I/O board 180. These signals are sent to latches for generating multiple camera commands for controlling a video camera 77a, 77b, or 77c. This feature provides the creation of predefined camera scenes by the user, speaking only one word. A reset signal generated by the computer interface and control logic circuit 181 is sent on communication path 53a to clear the latches. Control signals "CNTL" 53b are also generated by the computer interface and control logic circuit 181 to pulse the watchdog timer 182, to generate a reset signal, and to toggle the active/standby circuit for turning on either the active or standby LED 60b, over communication path 56b. The active/standby LEDs let the user know by visual signal, in addition to the display 10, that the ASRS is in the standby or active mode. The front panel interface logic 184 also interfaces the active/standby manual switch 60a, shown in FIG. 2, via the communication path 56a. The signals for turning on the front panel power and the reset LEDs are also present on communication path 56b. In addition, the buffer 186 provides for reading the active/standby switch. The switch line is tapped off the front panel interface logic 184 and goes into the input of buffer 186. The output of the buffer 186 is routed to the computer data interface and control logic 181. A command from the computer 130 causes a control signal to be generated in communication path 53b which lets the computer read the bit. If the bit is set high, the switch is closed. If not, the switch is opened. This feature is usefuil when a manual response rather than a verbal response is desired, such as "yes" to a query. In this mode of operation, the interrupt ordinarily occurring when the active/standby switch is depressed is disabled.

BIOMEDICAL EMBODIMENT OF THE INVENTION

The foregoing has presented a detailed description of the elements, and the functional cooperation of the elements of the ASRU and the ASRS. The description was presented using the control of a closed circuit television system. A second application of the invention, which falls within the biomedical realm, will now be presented in a brief format. The invention disclosure will be concluded by discussing additional applications of the invention and a summary of advantages of the invention over known prior art.

The invention is applicable in the biomedical field and, more particularly, in ultrasound imaging. In ultrasound imaging systems, the technician must manually apply a jell to the patient in the in which the ultrasound probing occurs. The jell serves as an acoustic coupling between the patient and the probe, thereby enhancing the ultrasound image. On occasions, more than one application of jell may be required. Currently, ultrasound functions are varied by means of a touch-screen which overlays the ultrasound image monitor. During ultrasounding, the technician may inadvertently transfer jell to the monitor, thereby leaving finger prints on the monitor. The transferred jell can quickly accumulate and blur the diagnostic monitor image. A current alternate means for selecting ultrasound functions is through a trackball or "mouse". Using this method, the technician must look at the monitor to select the proper icon thereby distracting his attention from the ultrasounding operation. Jell can also accumulate on the mouse. Using both means of selecting ultrasound functions, the technician is further distracted, thereby slowing the examination process. In addition, the unwanted transfer ofjell to equipment is detrimental.

Elements of the ASRU of the present invention can be configured and programmed for solving operational problems associated with current ultrasounding methodology. Depending upon the desired capabilities, a voice activated ultrasound system (VAUS) can free the eyes and the hands of the technician while the ultrasounding procedure is occurring. The VAUS can be a stand-alone unit providing computer and discrete ports to control external devices. The computer port can be used for sending commands to the ultrasound system. Discrete outputs can be used for controlling devices such as lights and intercoms. As a result, the technician can control everything within the examining room by voice commands.

Figure 4:
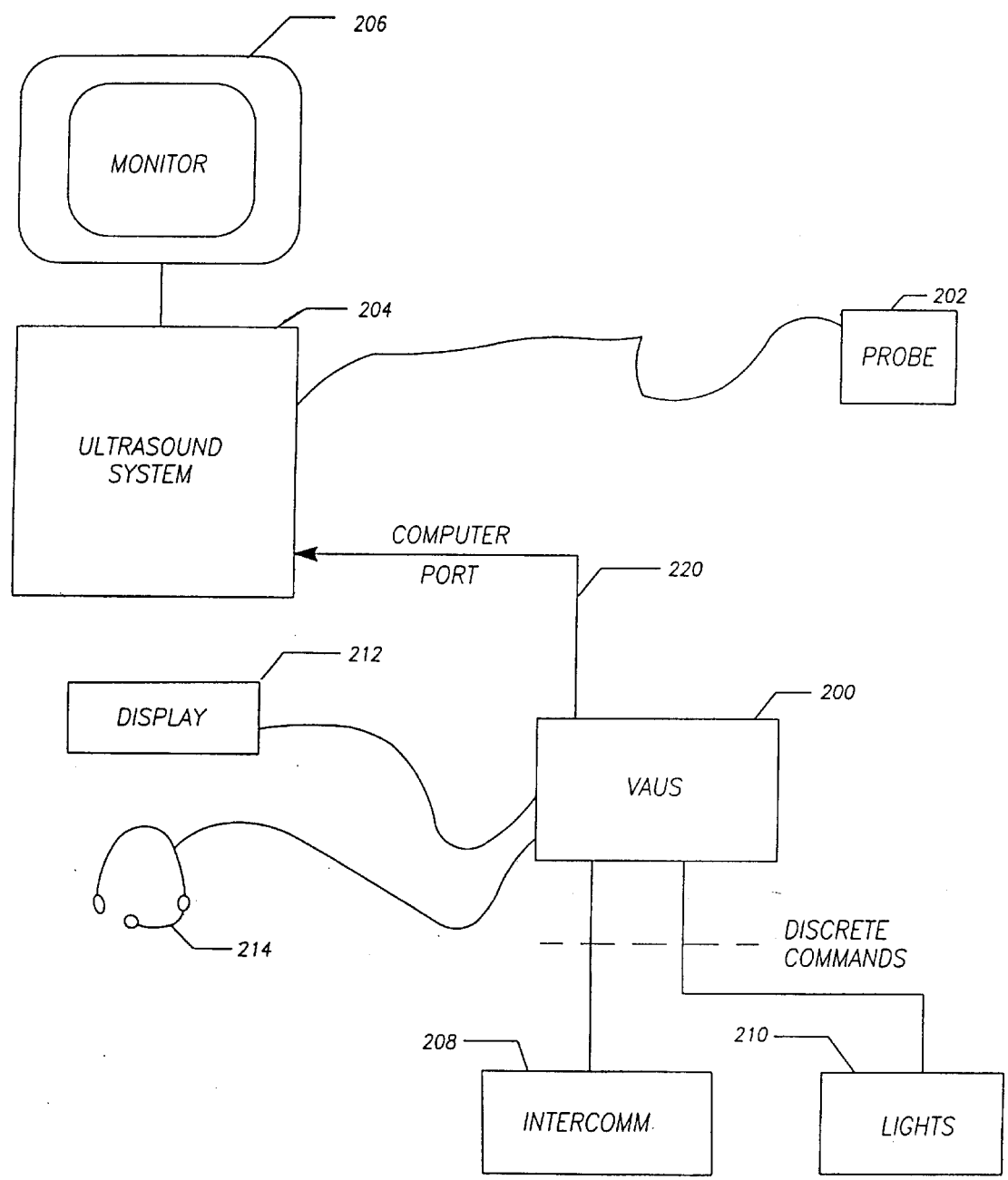
FIG. 4 depicts in general the invention adapted to control a biomedical ultrasounding system.

Attention is directed to FIG. 4 which depicts the VAUS 200 controlling the ultrasound central unit 204 through a computer port identified by the numeral 220. The monitor 206 and probe 202 cooperate with the central unit 204 to display and acquire image data, respectively. A head set assembly with earphone plugs, identified by the numeral 214, plugs directly into the VAUS listener board (not shown) comprising an analog I/O board and an independent speech recognizer board which correlate with corresponding components in the previous embodiment. Operational characteristics and functions of these boards have been discussed previously. The digital I/O board (not shown) of the VAUS system, which has also been discussed previously, can comprise AC switches for controlling devices within the ultrasound examining room such as light switches or dirmmers and intercommunication systems denoted by the numerals 210 and 208, respectively. The vocabulary of this particular application of the invention is again processed such that it is speaker independent (as previously described) and, therefore, would not require training time from the technician. Moreover, since the speech recognizer is speaker independent, any technician can effectively operate the system.

Operational feedback of the system is provided in both audio and visual form with the primary form of feedback being audio tones that guide the technician regarding word recognition status. Tones for recognized words, transitioning into another node, and questionable recognitions allows the technician to concentrate on the ultrasound operation. The display 212 would serve as a secondary form of feedback which would be particularly useful to technicians with hearing problems.

Word recognition confidence checking and microphone amplitude adjustment calibration, performed prior to initiating the ultrasounding procedure, insure good word recognition during the procedure. Should word recognition scores begin to drop during the procedure, the VAUS software initiates a microphone calibration routine in the event that microphone placement changes during the procedure. The use of the system by a new technician may require a slight relaxation of recognition parameters. This relaxation would occur during the calibration check and would be under the control of executive software. In addition, continued low recognition scores even with repeated microphone calibrations and recognition parameter adjustments could be indicative of a fatigued technician.

ADDITIONAL EMBODIMENTS OF THE INVENTION

As mention previously, the foregoing embodiments of the invention are by no means limiting. Industrial applications of the ASRS can be incorporated in the inspection of parts on an assembly line wherein defective parts and parts out of tolerance are reported and corrective measures are taken based upon the verbal reports. In the consumer automotive industry, the ASRS is useful to provide "hands-off" control of various components of the automobile such as a radio, an air conditioning unit, a car telephone, a car facsimile unit and a global positioning system, if the automobile is so equipped. In military applications, the rugged design of the ASRS makes the technology ideal for status reporting in the cockpit of an aircraft or a tank.

In the field of robotics, one person must often control all aspects of the robot as well as perform other functions. The ASRS would allow voice macro commanding of various robotic operations such as the grappling of the robot hand or the controlling of the robot camera and lighting system. One such application would be the command of an underwater robot. In the field of security and surveillance, the ASRS technology allows a guard to select a plurality of surveillance cameras and monitors as well as control the pan, tilt and zoom functions of each camera. In speech recognition therapy, the ASRU can be trained as an aid for helping patients with speech and other physical impediments. As an example, an ASRS could be used to control a wheel chair or to interact with a computer thereby helping the impaired person to become a more self sufficient and productive citizen. In this particular application, a macro could be created for each utterance.

From the above description, it should be apparent that the basic ASRS technology is applicable to many environmental and operations which involve human operational interfacing with an almost limitless number of commanded or controlled devices. Although the range of applications presented and suggested in this disclosure is extensive, these examples by no means limit the scope of the invention.

SOFTWARE FUNCTIONAL FLOW DIAGRAMS

Figure 5A:
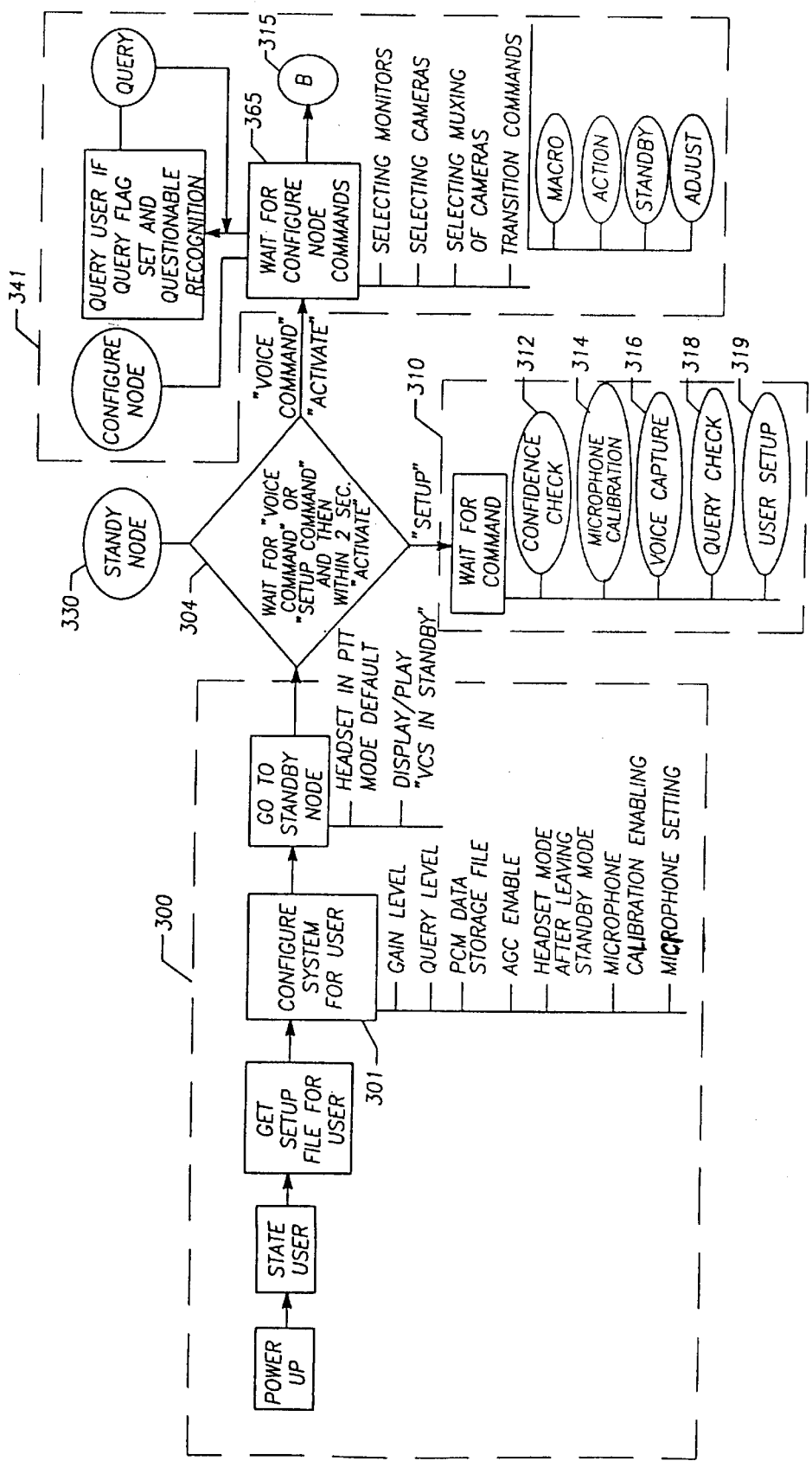
FIGS. 5A and 5B illustrate a functional flow diagram of the system software using the robot voice command system embodiment as an example.
Figure 5B:
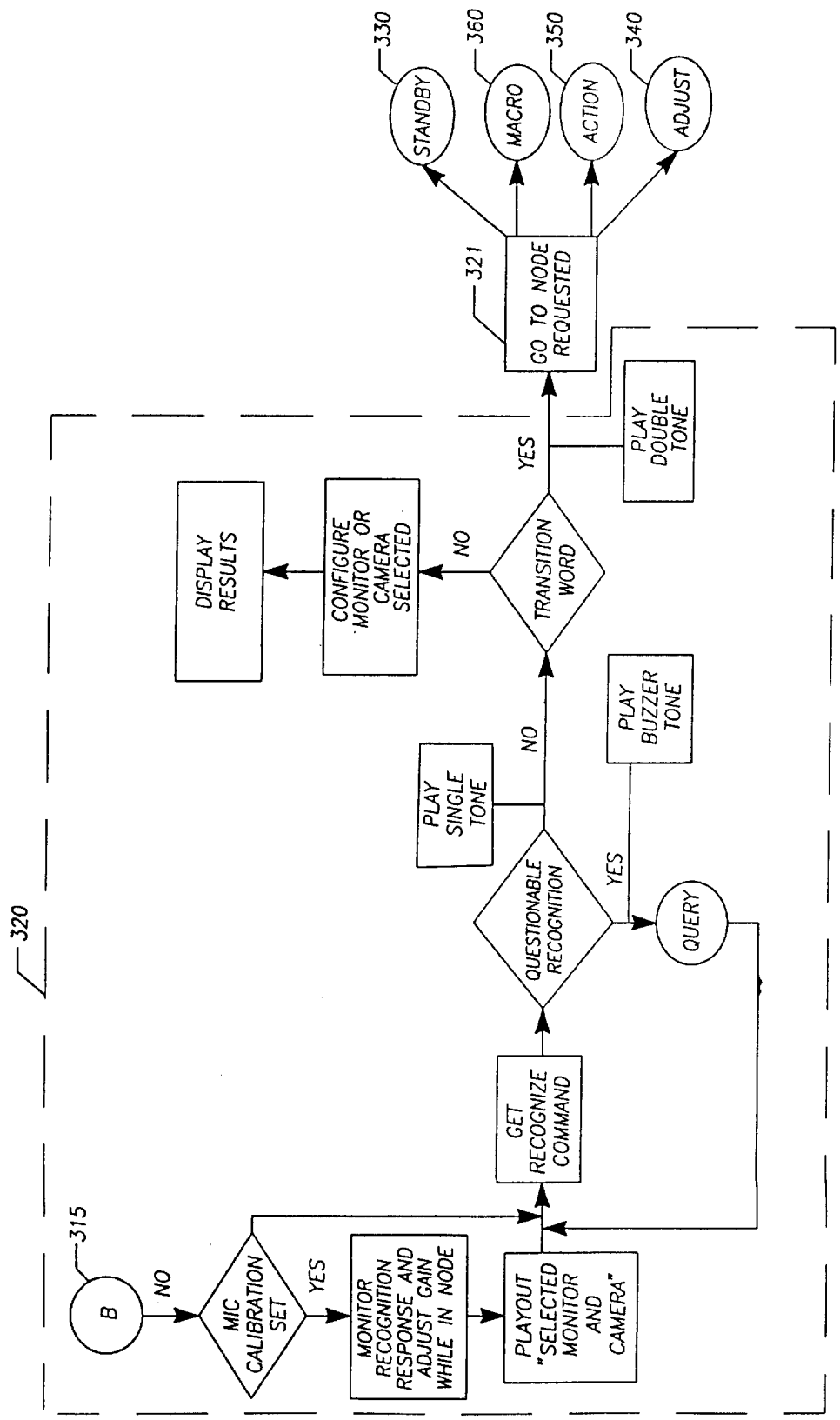

The preferred software embodiment will be illustrated using the previously discussed video control VCS embodiment as an example. FIGS. 5A and 5B provide an overview of the functional flow diagram of the system software. Referring first to FIG. 5A, the box identified by the numeral 300 illustrates the steps involved in the initial power up of the system, including the query of the specific user and the initial set up of the system based upon the recorded voice file for the user. Once this process has been completed, the system awaits the voice command or set up command as illustrated at 304. Set-up steps are illustrated in general in the block 310, and include the specific steps of confidence checking, microphone calibration, voice capture and query check as designated by the numerals 312, 314, 316, and 318, respectively. These steps have been discussed in detail in previous sections. Voice command steps are illustrated in general by the block 341 with specific functions, which also have been discussed previously, being identified by name. With additional reference to FIG. 5B, the flow diagram continues at the point identified by the numeral 315 as illustrated in FIG. 5B. The block 320 illustrates in general the previously discussed feature of the invention whereby the microphone element of the system and word or command recognition element of the system are adjusted while the system is operating in the active mode. Upon completion of these adjustments, the system is ready to accept a node request as illustrated by the step 321. Node requests are denoted as standby, macro, action and adjust and are denoted by the numerals 330, 360, 350 and 340, respectively. Again, all of these nodes have been discussed in detail in previous sections of this disclosure.

Figure 6:
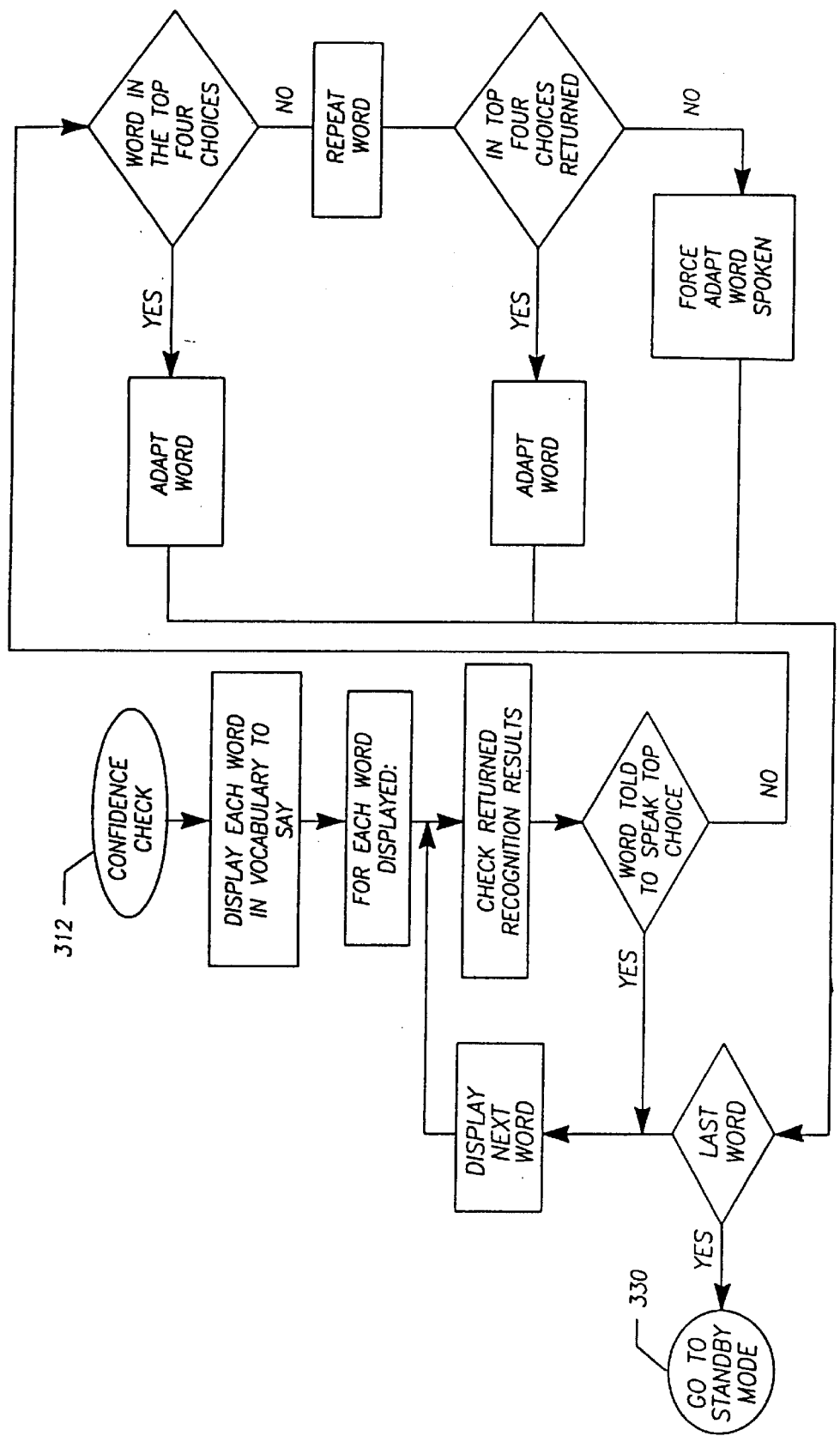
FIG. 6 illustrates in detail the confidence check subroutine of the system software.
Figure 7:
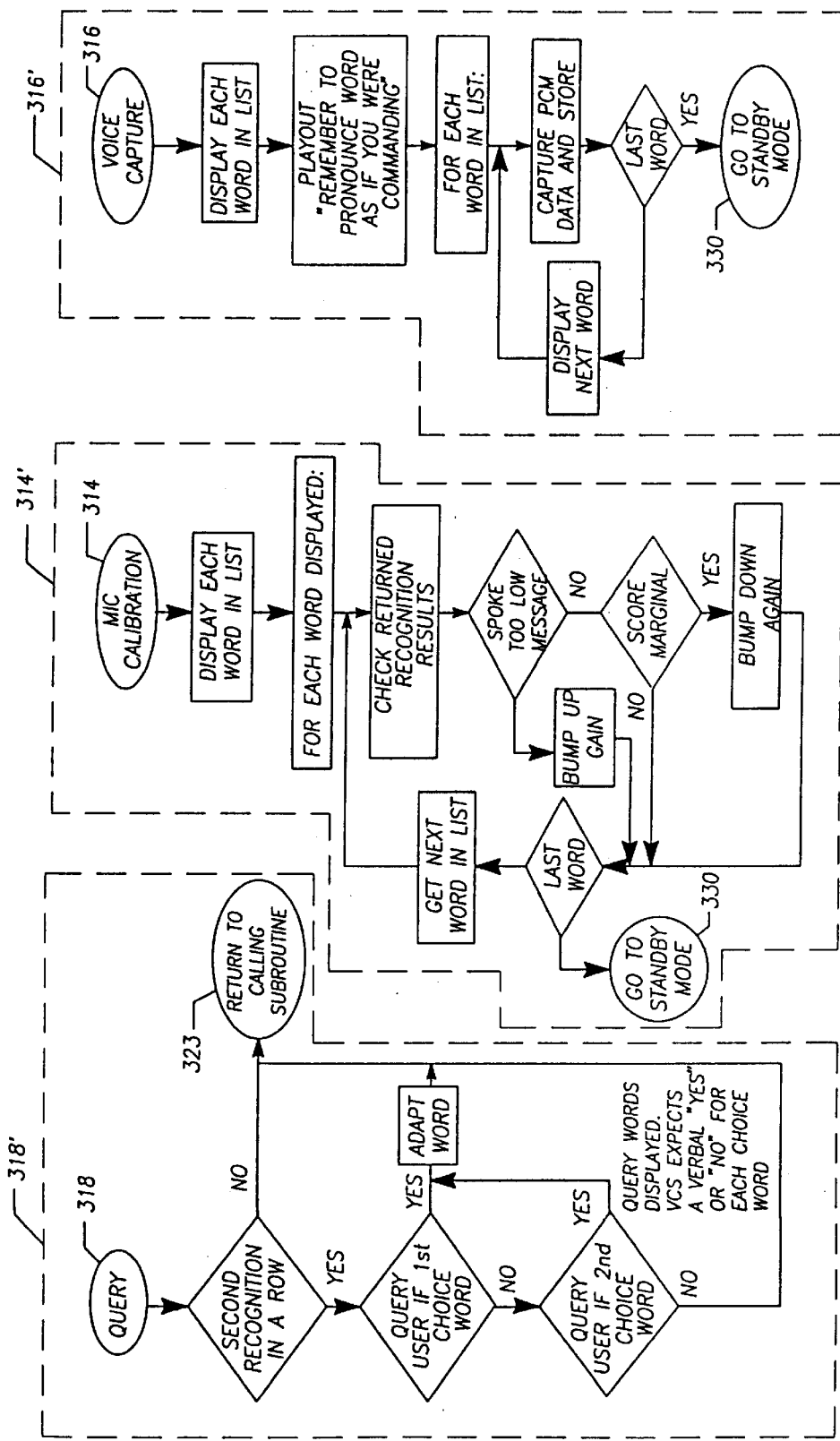
FIG. 7 illustrates in detail the query, microphone and voice capture subroutines of the system software.

FIG. 6 depicts details of the system confidence check process 312 of the setup phase. Once recognition criteria have been met using interactive exchanges between the user and the system, the system returns to the standby mode 330. Turning now to FIG. 7, the microphone calibration function 314 is illustrated by the steps depicted in the block 314'. Upon completion of this phase of the setup, the system returns again to the standby mode 330. The voice capture function 316' is illustrated by the steps illustrated in the block 316'. Upon completion of this phase of the setup, the system once again returns to the standby mode 330. The query function 318 of the set up is depicted by the steps within the block 318'. Since the query subroutine can be called not only in the initial setup of the system but also at various points within the applications mode of the system, completion of the query subroutine returns the system to the calling subroutine as indicated by the numeral 323.

Figure 8:
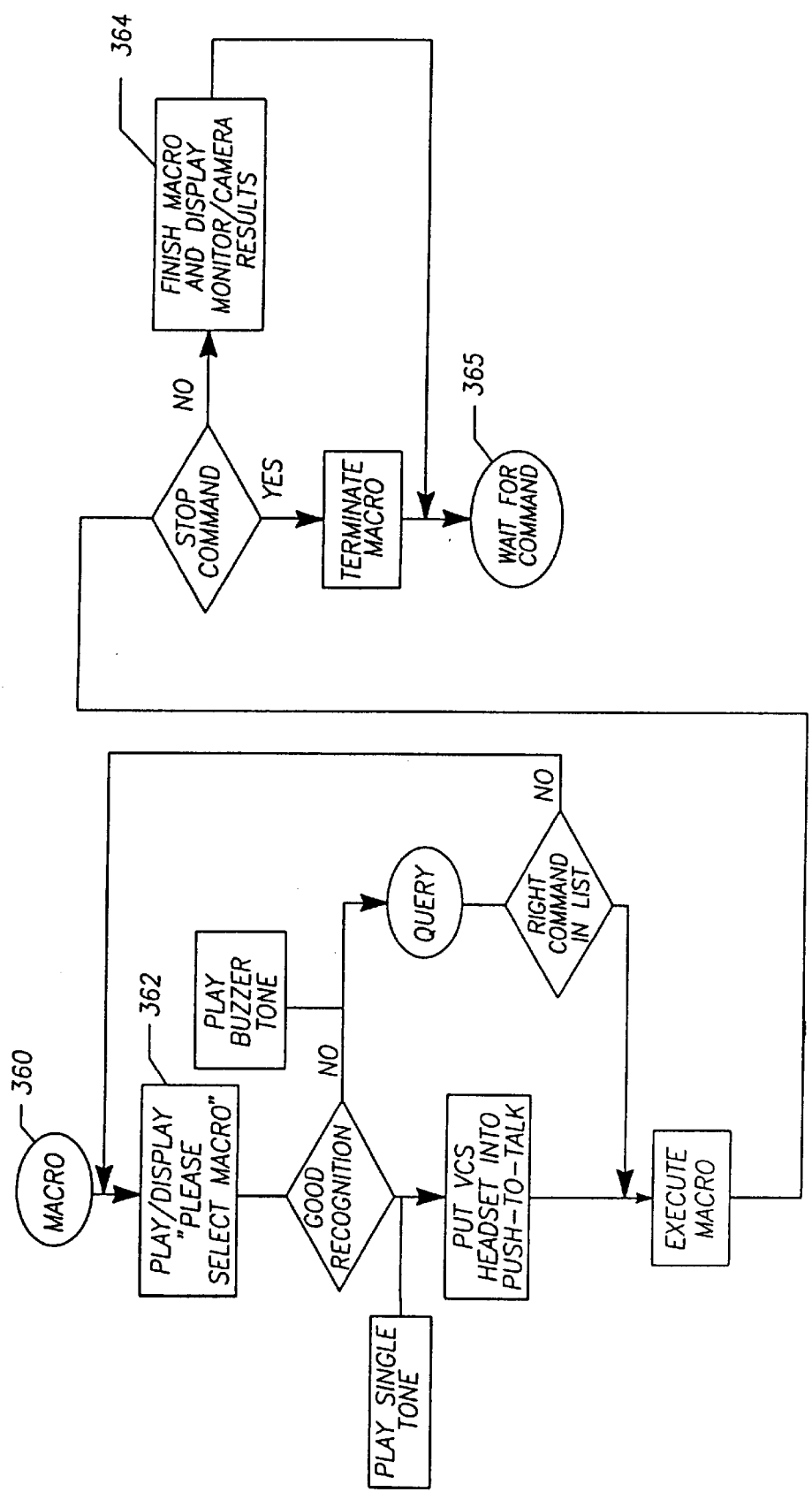
FIG. 8 illustrates in detail the macro applications subroutine of the system software.
Figure 9:
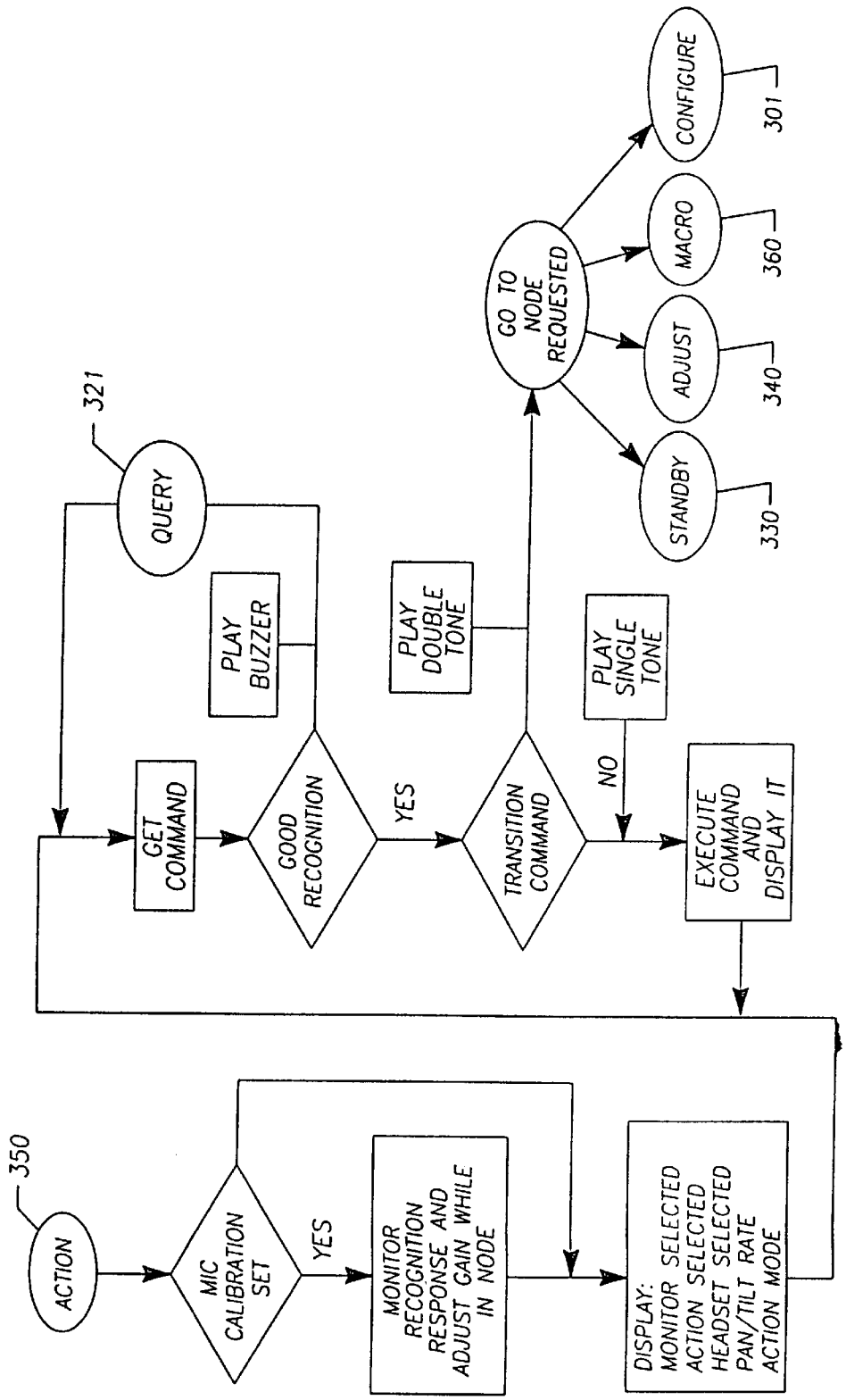
FIG. 9 illustrates in detail the action subroutine of the system software.
Figure 10:
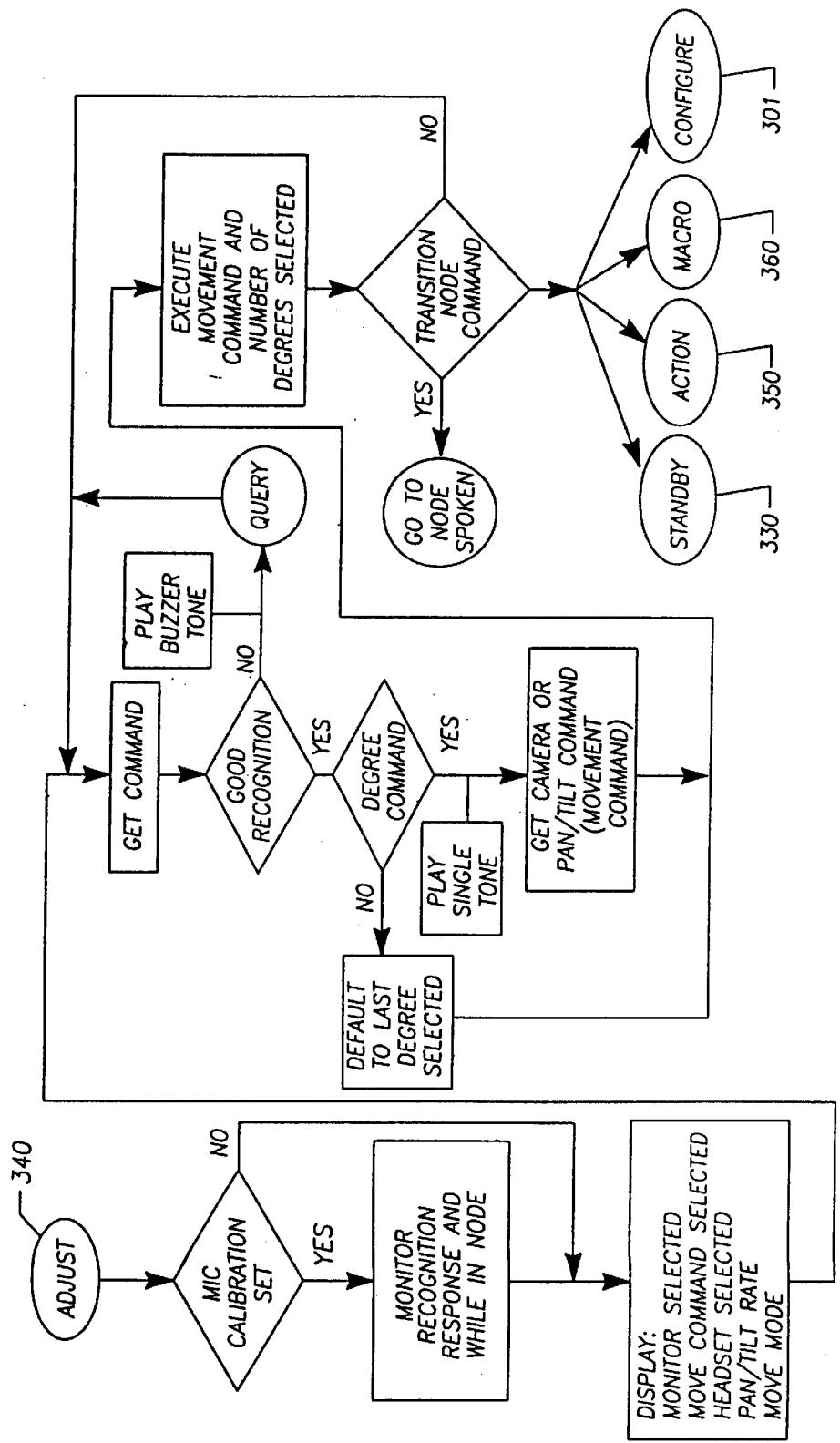
FIG. 10 illustrates in detail the adjust subroutine of the system software.

Attention is now directed to details of the transition commands denoted within the block 341 of FIG. 5A, as shown in greater detail in FIG. 8. The macro routine queries the user to select a macro command at 362. Recognition is checked and the results of the macro command are displayed as indicated at 364. Upon completion of the macro command, control is returned as indicated at 365, wherein the system awaits the next macro command. FIG. 9 illustrates details of the action subroutine 350. In the action node, pan/tilt and camera movement commands can be initiated such as "pan left" or "tilt up". Upon successful completion of this function, the system is returned to the node request function denoted by the numeral 321. FIG. 10 depicts the adjust subroutine 340 wherein the cameras and pan/tilt units are adjusted according to the spoken commands. The user must first select a degree of movement by indicating a desired number of degrees of movement desired, such as 5, 10 or 15 degrees. Then the user speaks the moveeet command such as "pan left". The system subsequently executes the commands by panning the camera leftwardly the number of degrees chosen. Upon completion of the spoken adjust commands, the system is configured to accept the next node command.

Figure 11:
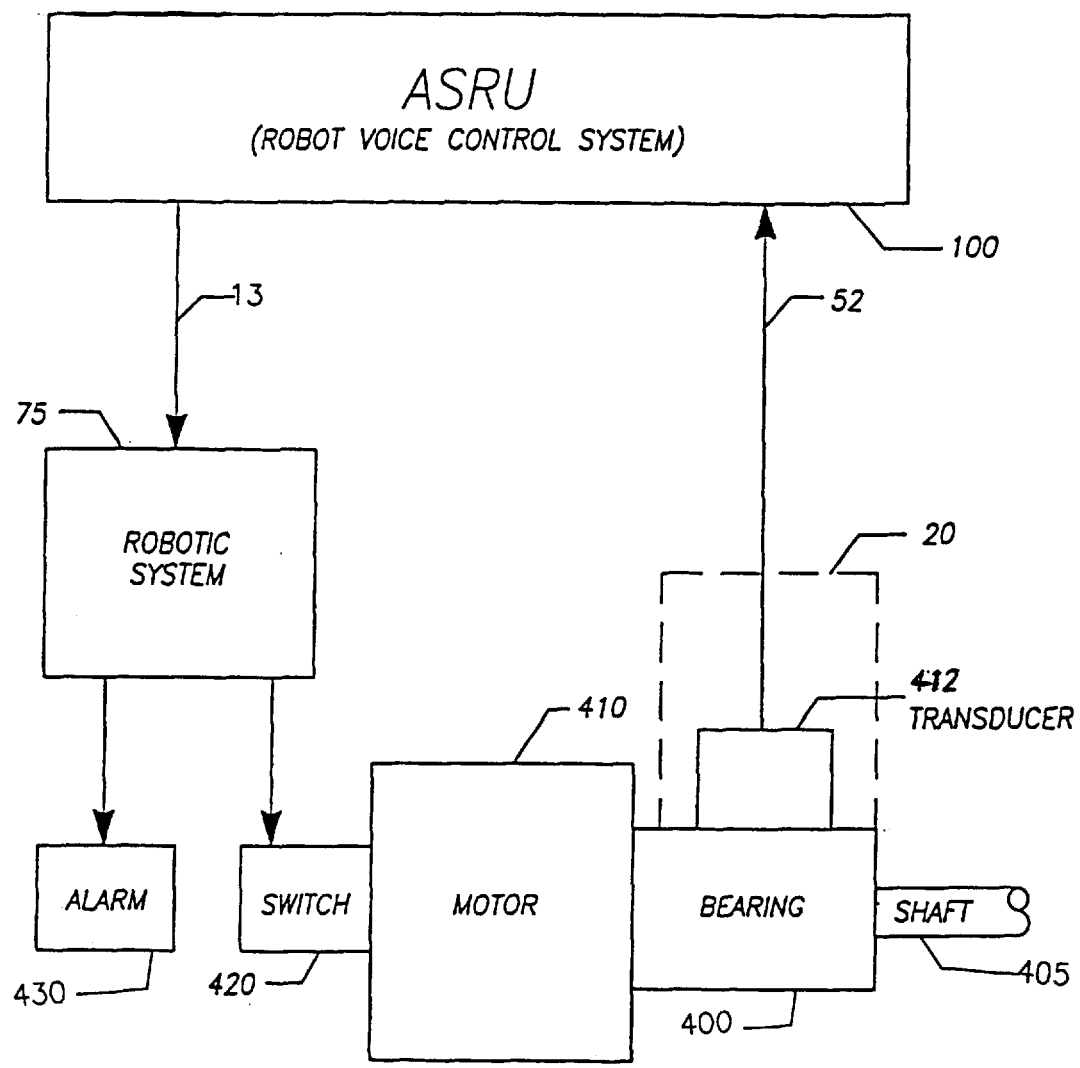

As shown in FIG. 11, the ASRU 100 provides a communication signal to the robotic system 75 over the channel 13. The robotic system 75 provides alarm indication through an alarm 430 and a control signal to a switch 420 for a motor 410. In turn, the ASRU 100 receives an input signal over a channel 52 from a transducer 412. The transducer 412 is mounted to a bearing 400 of a shaft 405 of the motor 410 for monitoring performance parameters of the bearing 400. The transducer 412 is an integral part of the audio transducer 20 (FIG. 1).

SUMMARY

The adaptive speech recognition system and associated equipment and methodology offer many advances over prior art systems. Moreover, system software changes can be made quickly with the system hardware remaining in-situ and on-line. The microphone calibration method and apparatus minimize errors caused by variances in microphone placement with respect to the speaker. The speaker independent feature of the system reduces user training time. The confidence checking and adaptation of the speaker's voice to the vocabulary ensures that the system will work effectively even if the user's voice changes due to physiological or psychological factors. Raw voice samples are captured and recorded during application usage of the system and are subsequently used to insure proper word framing and to further develop and improve operation of the system. The architecture of the system provides a cost effective and highly flexible, adaptive, embedded system that allows easy hardware and software upgrades as technology evolves.

The foregoing is directed to the preferred embodiments of the invention and sets forth preferred apparatus and methods of use thereof While the foregoing sets forth preferred embodiments, the scope thereof is determined by the claims which follow.

what is claimed is:

1. An adaptive speech recognition and control system, comprising:
   a speech recognition circuit section including memory means for storing a plurality of vocabulary subsets, each of the plurality of vocabulary subsets identified by a node, each subset comprising a plurality of voice templates;
   a microphone;
   analog circuitry associated with the microphone for processing voice commands spoken into the microphone and conducting the processed signals to the speech recognition circuitry;
   processing means associated with the speech recognition circuitry for causing the speech recognition circuit section to user-selectively transition to a node which opens a memory section storing a selected vocabulary subset, corresponding to a spoken transitional command, in response to a predetermined transitional command being spoken into the microphone by an operator, and for subsequently causing the speech recognition circuitry to search the voice templates stored in the selected subset upon a vocabulary term subsequently being spoken while the speech recognition circuit is transitioned to the node corresponding to the selected vocabulary subset, and for determining, within a degree of certainty, whether the vocabulary term matches one of the voice templates in the selected subset.

2. The system of claim 1, wherein the analog circuitry comprises first and second, serially connected gain adjustment circuits, and wherein the processing means further comprises recognition feedback means for determining whether a plurality of successively processed vocabulary terms have been matched to respective voice templates with an acceptable level of probability or an unacceptable level of probability, and, if an unacceptable level of probability is sensed after a predetermined number of verbal commnands, for varying the operation of at least one of the gain adjustment circuits for modifying the signals fed to the speech recognition circuitry to increase the percentage of recognition within acceptable probability levels of spoken vocabulary terms.

3. The system of claim 2, wherein the first gain adjustment circuit comprises a voltage controlled analog switching circuit, and wherein the second gain adjustment circuit comprises a programmable, digitally controlled gain amplifier, and wherein the processing means comprises means for enabling the first gain adjustment circuit of the analog switching circuit upon an unacceptable level of speech recognition occurring and, if an unacceptable level of speech recognition continues, for digitally adjusting the programmable gain amplifier.

4. The system of claim 2, wherein the processing means comprising means for enabling and adjusting the gain of the first gain adjustment circuit in response to a series of spoken vocabulary terms of low mean volume level but within an acceptable, limited range of volume levels, and alternatively, for adjusting the gain of the second gain adjustment circuit in response to a series of spoken vocabulary terms of acceptable average volume level but of an undesirable wide range of volume levels.

5. The system of claim 1, further comprising means for indicating to the operator the vocabulary term of the voice template selected by the speech recognition circuit section as matching a spoken vocabulary term.

6. The system of claim 5, further comprising audible and visible means for indicating to the operator that the speech recognition circuit section has transitioned to a node, identified to the operator, in response to a transitional command.

7. The system of claim 1, further comprising means for storing selected vocabulary terms as voice templates and for subsequently retraining the voice templates in accordance with the current speech patterns of an operator.

8. The system of claim 7, wherein the means for retraining the voice templates comprises means for successively displaying vocabulary terms stored in the memory for prompting the operator to speak the respective terms and for comparing voice characteristics associated with respective vocabulary terms spoken by the operator, in response to the displayed terms, with the speech patterns stored in the respective sequentially activated voice templates, and for reprogramming respective voice templates upon determining that their stored speech patterns do not correspond, within acceptable limits, with the current voice pattern of the operator as a selected vocabulary term is spoken.

9. The system of claim 7, wherein the speech patterns stored within respective voice templates encompass a range of permissible voice patterns corresponding to voice patterns associated with speech characteristics of a plurality of operators.

10. The system of claim 7, wherein the system is operative, in accordance with the voice training and retraining process, in either of a training mode, or an operative mode, and wherein the system further compromises means for retraining the voice templates during the operative mode in response to a non-recognized vocabulary term spoken during the operative mode.

11. The system of claim 7, wherein the system includes a local RAM memory associated with the speech recognizer circuit and a vocabulary memory, and wherein updating changes are stored in voice templates stored in the local RAM memory, further comprising means for downloading the updated voiceprints to the vocabulary memory, and for downloading the voiceprints stored in the vocabulary memory into the local RAM memory during activation of the system.

12. The system of claim 7, further comprising a commanded system controlled by the voice command system and an output section connected to the system controlled by the voice command system, and wherein, in its operative mode, the speech recognition and control system comprises means for transmitting command signals, corresponding with verbal commands spoken by the operator, from the output section to the controlled system.

13. The system of claim 12, wherein the controlled system comprises a robotic system, and wherein the voice command system comprises means for controlling the robotic system in response to verbal commands of the operator.

14. The system of claim 7, wherein the system includes voiceprint training means for training the voice templates, within a user adjustable threshold of voice recognition, in accordance with spoken terms and, in the event, after an initial cycle of training, the voiceprint still does not match the spoken term, for forcing a retraining change in the voice template.

15. The system of claim 7, wherein the means for retraining the voiceprints comprises means for comparing the history of speech characteristics of an operator with respect to each vocabulary term and, during retraining of the voice template, integrating the newly entered voice characteristics with previously stored voice characteristics.

16. The apparatus of claim 1, further comprising input output circuitry including switching means operable by an operator for controlling the system independently of the voice activated circuit portions.

17. The apparatus of claim 16, wherein the switching means comprises means for node selection, and for permitting independent operator control of the processor node.

18. A speech recognition method comprising the steps of:
storing a plurality of vocabulary subsets in a memory of a speech recognition apparatus, each vocabulary subset comprising a plurality of voice templates, and each vocabulary subset identified by a node;
receiving a speech signal in an analog section of the speech recognition apparatus, the speech signal comprising a command term and a vocabulary term;
digitizing the received speech signal to a digital form;
processing the digitized speech signal, causing the speech recognition apparatus to transition to a node which opens a memory section storing a selected vocabulary subset, corresponding to the command term;
searching the voice templates stored in the selected subset for a match with the vocabulary term; and
determining, within a level of probability, whether the vocabulary term matches one of the voice templates in the selected subset.

19. The method of claim 18, further comprising the steps of:
determining whether a plurality of successively processed vocabulary terms have been matched to respective voice templates with an acceptable level of probability or an unacceptable level of probability, and,
if an unacceptable level of probability is determined after a predetermined number of command terms, modifying the speech signal fed to the speech recognition apparatus to increase the percentage of recognition within acceptable probability levels of spoken vocabulary terms.

20. The method of claim 19, wherein the step of modifying the speech signal fed to the speech recognition apparatus is performed by digitally adjusting a programmable gain amplifier.

* * * * *